United States Patent
Bossmann et al.

(10) Patent No.: US 12,540,080 B2
(45) Date of Patent: Feb. 3, 2026

(54) GRAPHENE/GRAPHENE OXIDE CORE/SHELL PARTICULATES AND METHODS OF MAKING AND USING THE SAME

(71) Applicant: Kansas State University Research Foundation, Manhattan, KS (US)

(72) Inventors: Stefan H. Bossmann, Kansas City, MO (US); Christopher Sorensen, Manhattan, KS (US); Jose Covarrubias, Manhattan, KS (US); Madumali Kalubowilage, St. Louis, MO (US); Arjun Nepal, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 939 days.

(21) Appl. No.: 17/620,357

(22) PCT Filed: Jun. 17, 2020

(86) PCT No.: PCT/US2020/038055
§ 371 (c)(1),
(2) Date: Dec. 17, 2021

(87) PCT Pub. No.: WO2020/257229
PCT Pub. Date: Dec. 24, 2020

(65) Prior Publication Data
US 2022/0348467 A1   Nov. 3, 2022

Related U.S. Application Data

(60) Provisional application No. 63/016,637, filed on Apr. 28, 2020, provisional application No. 62/935,438,
(Continued)

(51) Int. Cl.
*C01B 32/194* (2017.01)
*C01B 32/198* (2017.01)
(Continued)

(52) U.S. Cl.
CPC .......... *C01B 32/194* (2017.08); *C01B 32/198* (2017.08); *C04B 20/023* (2013.01);
(Continued)

(58) Field of Classification Search
CPC ............................ C08K 3/042; C01B 32/198
See application file for complete search history.

(56) References Cited

U.S. PATENT DOCUMENTS 9,284,194 B2   3/2016   Lee et al.
9,382,117 B2   7/2016   Zhamu et al.
(Continued)

FOREIGN PATENT DOCUMENTS

CN   105585009   10/2014
CN   104136369   11/2014
(Continued)

OTHER PUBLICATIONS

Supplementary Search Report in European Patent Application Serial No. 20827703.8, dated Jul. 20, 2023.
(Continued)

*Primary Examiner* — Alexandre F Ferre
(74) *Attorney, Agent, or Firm* — Hovey Williams LLP; Crissa A. Cook

(57) ABSTRACT

Methods of preparing graphene/graphene oxide particulates under mild conditions, comprising reacting pristine graphene with hydrogen peroxide and a source of iron to oxidize the outer surface of the pristine graphene particu-
(Continued)

lates in solution and yield graphene/graphene oxide particulates. Methods and articles incorporating the same are also disclosed.

25 Claims, 23 Drawing Sheets

Related U.S. Application Data filed on Nov. 14, 2019, provisional application No. 62/862,251, filed on Jun. 17, 2019.

(51) Int. Cl.
| | | |
|---|---|---|
| C04B 20/02 | (2006.01) | |
| C08K 9/02 | (2006.01) | |
| C09D 11/037 | (2014.01) | |
| G01N 33/58 | (2006.01) | |

(52) U.S. Cl.
CPC ............. *C08K 9/02* (2013.01); *C09D 11/037* (2013.01); *C01P 2002/78* (2013.01); *C01P 2004/50* (2013.01); *C01P 2004/80* (2013.01); *C01P 2006/37* (2013.01); *G01N 33/587* (2013.01)

(56) References Cited

U.S. PATENT DOCUMENTS

| | | |
|---|---|---|
| 9,440,857 B2 | 9/2016 | Sorensen et al. |
| 9,688,594 B2 | 6/2017 | Wada et al. |
| 10,636,585 B2 | 4/2020 | Tang et al. |
| 2014/0162390 A1* | 6/2014 | Afzali-Ardakani ............ H10K 85/221 977/890 |
| 2014/0335010 A1 | 11/2014 | Sorensen et al. |
| 2015/0080513 A1 | 3/2015 | Wada et al. |
| 2020/0271740 A1 | 8/2020 | Uchida et al. |
| 2021/0354989 A1* | 11/2021 | Konishi ................ C01B 32/194 |

FOREIGN PATENT DOCUMENTS

| | | | |
|---|---|---|---|
| CN | 107074552 A * | 8/2017 | ........... C01B 32/182 |
| CN | 109019585 | 12/2018 | |
| EP | 2851341 | 3/2015 | |
| WO | 2013172316 | 11/2013 | |
| WO | WO-2016018995 A1 * | 2/2016 | ........... C01B 32/182 |
| WO | WO-2016172755 A1 * | 11/2016 | |
| WO | 2017219111 | 12/2017 | |
| WO | 2018105570 | 6/2018 | |
| WO | 2018216689 | 11/2018 | |
| WO | 2017163464 | 5/2021 | |

OTHER PUBLICATIONS

Martin, et al., "Fenton-Treated Functionalized Diamond Nanoparticles as Gene Delivery System", ACS Nano, 2010, 4(1), pp. 6574.
International Search Report and Written Opinion in corresponding PCT/US2020/038055, dated Dec. 3, 2020.
Kim, et al., "Doping Graphene with an Atomically Thin Two Dimensional Molecular Layer", Adv. Mater., 2014, 26, pp. 8141-8146.
Nepal, et al., "One-step synthesis of graphene via catalyst-free gas-phase hydrocarbon detonation", Nanotechnology, 2013, 24(24), 245602.
Brodie, "On the atomic weight of graphite", Philosophical Transactions of the Royal Society of London, 1859, 149, pp. 249-259.
Staudenmaier, Verfahren zur Darstellung der Graphitsaure (Process for preparing graphitic oxide), Ber Dtsch Chem Ges, 1898, 31, pp. 1481-1487 (Translation not available—reviewed in Dreyer et al. 2010 infra).
Hummers, et al., "Preparation of graphitic oxide", Journal of the American Chemical Society, 1958, 80(6), pp. 1339-1339 (abstract attached).
Al-Gaashani, et al., "XPS and structural studies of high quality graphene oxide and reduced graphene oxide prepared by different chemical oxidation methods", Ceramics International, 2019, 45, pp. 14439-14448.
Daswani, et al., "A new NBS/oxone promoted one pot cascade synthesis of 2-aminobenzimidazoles/ 2- aminobenzoxazoles: a facile approach", New J.Chem., 2016, 40, pp. 8093-8099.
Tang, et al., "Bottom-up synthesis of large-scale graphene oxide nanosheets", J. Mater. Chem., 2012, 22, pp. 5676-5683.
Johra, et al., "Facile and safe graphene preparation on solution based platform", J of Ind and Eng Chem, 2014, 20, pp. 2883-2887.
Dalecki, et al., "Combinatorial phenotypic screen uncovers unrecognized family of extended thiourea inhibitors with copper-dependent anti-staphylococcal activity", Metallomics, 2016, 8, pp. 412-421.
Xu, et al., "Nanocomposites of graphene and graphene oxides: Synthesis, molecular functionalization and application in electrochemical sensors and biosensors. A review", Microchim Acta, 2017, 184, pp. 1-44.
Hossain, et al., "Chemically homogeneous and thermally reversible oxidation of epitaxial graphene", Nature Chem, 2012, 4, pp. 305-309.
Dong, et al., "Synthesis and reduction of large sized graphene oxide sheets", Chem. Soc. Rev., 2017, 46, pp. 7306-7316.
Dreyer, et al., "The chemistry of graphene oxide", Chem. Soc. Rev., 2010, 39, pp. 228-240.
James, et al., "Graphene: Powder, Flakes, Ribbons, and Sheets", Accounts of Chem Res, 2013, 46(10), pp. 2307-2318.
Kondratowicz, et al., "Optimization of Graphene Oxide Synthesis and Its Reduction", Nanoplasmonics, Nano-Optics, Nanocomposites, and Surface Studies, 2015, pp. 467-484.
Luong, et al., "Gram-scale bottom-up flash graphene synthesis", Nature, 2020, 577, pp. 647-651.
Supplementary Search Report in corresponding European Patent Application Serial No. 20827703.8, dated Jan. 8, 2024.
Wang, et al., "Optimizing oxygen functional groups in graphene quantum dots for improved antioxidant mechanism", Physical Chemistry Chemical Physics, 2018, 21(3), pp. 1336-1343.
Li, et al., "Nitrogen-Doped Graphene Quantum Dots with Oxygen-Rich Functional Groups", Journal of the American Chemical Society, 2012, 134(1), pp. 15-18.
Second Review Opinion Notice in corresponding Chinese Patent Application Serial No. 202080044355.4, dated Feb. 24, 2024 (English machine translation attached).
Decision of Rejection in co-pending Chinese Patent Application Serial No. 2020800443554, dated Jul. 6, 2024 (English translation attached).
Notice of Reasons for Refusal in co-pending Japanese Patent Application Serial No. 2021-574910, dated Jul. 5, 2024 (English translation attached).
Office Action in corresponding Chinese Patent Application Serial No. 2020800443554, dated Sep. 2, 2023 (English translation attached).
Notice of Reasons for Refusal in co-pending Japanese Patent Application Serial No. 2021-574910, dated Feb. 13, 2025 (English translation attached).
Office Action in co-pending Canadian Patent Application Serial No. 3,143,502, dated Jun. 3, 2025.
Office Action in co-pending Australian Patent Application Serial No. 2020294684, dated Jul. 1, 2025.
Notice of Allowance in co-pending Japanese Patent Application Serial No. 2021-574910, dated Feb. 13, 2025 (English translation attached).

* cited by examiner

GRAPHENE/GRAPHENE OXIDE CORE/SHELL PARTICULATES AND METHODS OF MAKING AND USING THE SAME

CROSS-REFERENCE TO RELATED APPLICATIONS

The present application is the U.S. National Stage of International Patent Application No. PCT/US2020/038055, filed Jun. 17, 2020, entitled GRAPHENE/GRAPHENE OXIDE CORE/SHELL PARTICULATES AND METHODS OF MAKING AND USING THE SAME, which claims the priority benefit of U.S. Provisional Patent Application Ser. No. 62/862,251, filed Jun. 17, 2019, Ser. No. 62/935,438, filed Nov. 14, 2019, and Ser. No. 63/016,637, filed Apr. 28, 2020, each entitled GRAPHENE TO GRAPHENE/GRAPHENE OXIDE CORE/SHELL PARTICULATES AND METHODS OF MAKING AND USING THE SAME. Each of the foregoing applications is incorporated by reference in its entirety herein.

BACKGROUND OF THE INVENTION

Field of the Invention

The present invention relates to particulate graphene-based materials with an oxidized surface which can be further functionalized to create a variety of derivative compounds.

Description of Related Art

Graphene is a two-dimensional monolayer of $sp^2$ bonded carbon atoms in a hexagonal crystal structure. Graphene sheets stack to form graphite with an interplanar spacing of 0.335 nm. Graphene has drawn considerable interest because of its unique physical properties including excellent mechanical strength, high intrinsic carrier mobility at room temperature, and electrical and thermal conductivity comparable to the in-plane value of graphite. These properties open gateways for the potential applications of graphene in technological areas such as nanoelectronics, sensors, nanocomposites, batteries, supercapacitors, hydrogen storage, solar cells, light-emitting diodes (LED), touch panels, and smart glass for windows, phones, or other devices. Use of graphene in medical and biological application is also contemplated. However, use of graphene has been hindered by poor solubility and dispersibility due to the hydrophobic nature of the material and its strong van der Waals forces. Thus, graphene is only suitable for obtaining physical mixtures and not chemical bonds. Functionalized derivatives of graphene, such as graphene oxide (GO) have been explored as improvements.

The classic approaches to GO start with graphite (G) and use strong oxidizers and harsh chemical reaction conditions. The three basic approaches were developed by Brodie ($KClO_3$ in $HNO_3$) (On the atomic weight of graphite. *Philosophical Transactions of the Royal Society of London* 1859 (149) 249-259), Staudenmaier ($KClO_3$ in $H_2SO_4$ or $H_2SO_4/HNO_3$) (Verfahren zur Darstellung der Graphitsäure. Ber Dtsch Chem Ges 31: 1481-1487. 1898), or Hummers and Offeman (Hummers Method) ($NaNO_3$ and $KMnO_4$ in $H_2SO_4$) (Preparation of graphitic oxide. *Journal of the American Chemical Society* 1958, 80(6), 1339-1339). Numerous variations on these processes exist in the literature. They all have in common to start with graphite, which reacts to graphite oxide, which then undergoes exfoliation and further oxidation to graphene oxide (FIG. 1). The process of exfoliation is driven by harsh chemical conditions and subsequent heating. Sulfuric acid acts as intercalator between graphite layers, thus extending the layer distance of graphite from 0.335 nm to >0.6 nm. There is agreement in the literature that the classic syntheses of GO from graphite are all somewhat irreproducible and, therefore, not ideally suited for the applications of GO in materials science and electronics. In addition, the production of classic GO produces significant amounts of chemical waste and releases toxic gases, such as $ClO_3$, $NO_2$, or $N_2O_4$. Furthermore, sodium- and potassium-cations are hard to remove from graphene oxide after completion of the oxidation process, leading to impure materials. GO produced by means of chemical oxidation of graphite, followed by exfoliation and further oxidation also features carbonyl and carboxylic acid groups at the edges and epoxy and hydroxyl groups in the basal plane (FIG. 2).

Alternative approaches to synthesizing GO have been reported, including synthesis of graphene oxide nanosheets (GON) on surfaces via hydrothermal polymerization of glucose, followed by thermal annealing at 1300 K on quartz wafers. This method permits the synthesis of tunable monolayer and few-layer (<5) GONs with about 20 μm and 100 μm lateral extent, respectively. Although this appears to be a green approach to graphene oxide, this method is energy intensive and unable to produce large amounts of GO. Furthermore, the chemical structure of the GON on quartz is not fully characterized.

Another approach involves oxidized epitaxial graphene on SiC(0001) using atomic oxygen in ultra-high vacuum. The chemisorption of oxygen atoms on graphene was verified using scanning tunneling microscopy (STM), high-resolution core-level X-ray photoelectron spectroscopy (XPS), Raman spectroscopy and ultraviolet photoelectron spectroscopy (UPS). Thermal reversibility occurred at 533 K. Again, this approach, albeit interesting for the semiconductor industry, is unable to produce large quantities of chemically stable GO.

SUMMARY OF THE INVENTION

The present invention is broadly concerned with methods of preparing graphene/graphene oxide particulates. The methods generally comprise reacting pristine graphene particulates with hydrogen peroxide in an aqueous reaction solution at low pH (≤5.0) in the presence of a source of iron. The reaction solution is agitated or stirred for a period of time to react hydroperoxyl radicals generated in the reaction solution with the graphene particulates to oxidize the outer surface of the pristine graphene particulates in solution and yield graphene/graphene oxide particulates. The particulates can then be collected from solution.

Also described herein are graphene/graphene oxide particulate comprising a graphene core with a thin graphene oxide surface coating or shell, wherein the particulate comprises at least 85% carbon and up to about 15% oxygen.

Compositions comprising, consisting essentially, or even consisting of, a plurality of graphene/graphene oxide particulates according to various embodiments of the invention are also described herein. The composition can be characterized macroscopically as a fluffy or fuzzy black powder or particulate. In one or more embodiments, the composition is a free-flowing powder.

Also described herein are articles comprising a substrate having a surface and a layer comprising a G/GO composition according to various embodiments of the invention deposited on the substrate surface. In one or more embodiments, the composition is dispersed in a solvent system and wet-applied to the surface. In one or more embodiments, the composition is mixed with a polymer system and printed on the surface (e.g., including as a 3D form). In one or more embodiments, the graphene/graphene oxide particulates are reacted with a plurality of monomers to yield a composite polymer having said graphene/graphene oxide particulates integrated therein, and the composite polymer is deposited on the substrate surface. In one or more embodiment, the layer is a thin film having a thickness of less than 1 mm. In one or more embodiments, the layer is a thin film having a thickness of less than 0.5 mm. In one or more embodiments, the composition is sintered on the substrate surface.

Composite articles are also described herein. In one or more embodiments, the composite articles comprise a composition according to various embodiments of the invention dispersed in a polymer, resin, or cement matrix. Also described herein are composite polymers comprising a plurality of graphene/graphene oxide particulates according to various embodiments of the invention reacted with a polymer matrix. In one or more embodiments, the polymer is selected from the group consisting of polyethylene, polypropylene, polyvinyl chloride, polystyrene, polyacrylate, polyacrylamide, polymethylmethacrylate, polytetrafluoroethylene, polyester, polyamide, polyurethane, and co-polymers thereof.

Also described herein are solid articles comprising a composition according to various embodiments of the invention molded into a porous body, wherein the porous body is optionally sintered.

DETAILED DESCRIPTION

Figure 1:
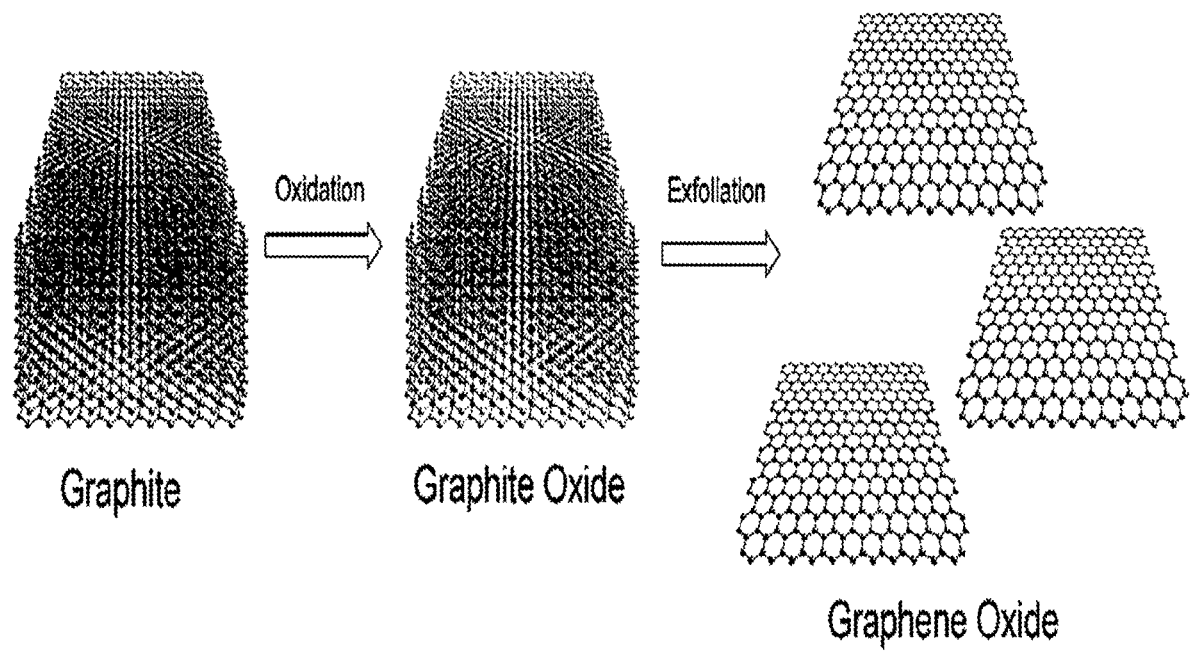
FIG. 1 is an illustration of a conventional synthesis of graphene oxide via graphite oxidation and exfoliation.
Figure 2:
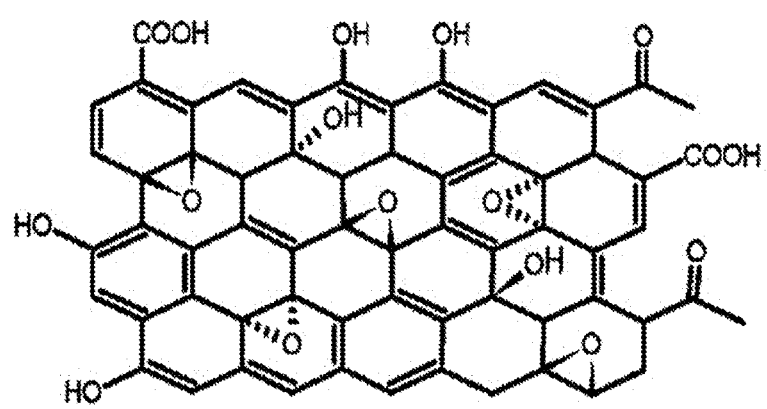
FIG. 2 illustrates the structure of GO produced via conventional chemical oxidation of graphite.

The present disclosure is concerned with new methods for the preparation of tailored graphene/graphene oxide (G/GO) particulates, preferably using detonation-synthesized graphene (Nepal et al., One-step synthesis of graphene via catalyst-free gas-phase hydrocarbon detonation. *Nanotechnology* 2013, 24 (24), 245602) as the starting material, and as a result we describe improved oxidized graphene particulate materials, functionalized derivatives of these materials, composites thereof, and uses thereof. Preferably, a pristine graphene starting material is used in embodiments of the invention. In other words, methods of the invention preferably do not involve exfoliation techniques or graphite starting materials, such as in the prior approaches.

Detonation-synthesized graphene is a preferred pristine graphene material, and its preparation process is described in detail in U.S. Pat. No. 9,440,857, incorporated by reference herein. It entails a one-step process involving the controlled detonation of carbon-containing material(s) as a solid, liquid, or gas, with an oxidizing agent or source of oxygen (e.g., $O_2$, $N_2O$, NO) in a reaction vessel at relatively high temperatures to produce pristine graphene nanosheets and ramified fractal aggregates of these nanosheets without the use of catalytic materials. In general, the reaction vessel is loaded with the desired amount of reactants and a spark is used to achieve detonation of the materials. An aerosol gel comprising graphene particles is produced. In a scaled-up approach, the apparatus comprises a reaction chamber, a vacuum source operably connected with the reaction chamber, and an ignition assembly. The reaction chamber is operably coupled with a source of a carbon-containing material and a source of an oxidizer. The vacuum source is operable to selectively evacuate at least a portion of the contents of the reaction chamber, especially following generation of the particulate materials. The ignition assembly is also operably connected to the reaction chamber and configured to initiate combustion of a quantity of the carbon-containing material and a quantity of the oxidizer delivered to the reaction chamber from their respective sources. The ignition assembly comprises a pair of electrodes that are operable to generate an ionizing arc therebetween, each electrode is contained within a respective cassette that is removably received within the ignition assembly.

Exemplary carbon-containing materials to use for the reaction include, carbon-rich precursors, gases, gas mixtures, powders, aerosols, and other injectable materials. The starting material can include any hydrocarbon compound, and in particular a saturated or unsaturated C1-C12 hydrocarbon compound. In certain embodiments, acetylene is a particularly preferred hydrocarbon material. The carbon-containing material may comprise a single material or compound, or a mixture of carbon-containing compounds.

In one or more embodiments, the combustion reaction occurs at a temperature of at least 3000 K, at least 3500 K, or at least 4000 K. In particular embodiments, the combustion reaction occurs at a temperature of between about 3000 K to about 5000 K, between about 3500 K to about 4500 K, or about 4000 K. It has been discovered that the combustion of the carbon-containing materials and oxidizer at these temperatures favors the formation of highly ordered graphene particulates as opposed to graphitic soot. Inert gaseous materials such as helium, neon, argon, or nitrogen can be included in the reaction mixture charged into the reaction vessel to assist with temperature control during combustion, if necessary. Also, in certain embodiments, especially in embodiments in which the combustion reaction is a detonation, the combustion of the reaction mixture proceeds very quickly. Detonation typically involves a supersonic exothermic front that accelerates through a medium and eventually drives a shock front propagating directly in front of it. In certain embodiments, the combustion has a duration of between about 5 to about 100 ms, between about 10 to about 75 ms, or between about 20 to about 50 ms.

The ratio of oxidizing agent to carbon-containing material present in the reaction vessel prior to detonation can contribute to the characteristics of the graphene particulates formed upon detonation of the reaction mixture. In certain embodiments, the molar ratio of oxidizing agent to carbon-containing material is 1.5 or less. In particular embodiments, the ratio of oxidizing agent to carbon-containing material is between about 0.1 to about 1.5, between about 0.2 to about 1.2, between about 0.2 to about 1.0, or between about 0.3 to about 0.8. The process permits the bulk synthesis or large quantities of graphene in excellent purities.

Alternative approaches for synthesizing pristine graphene include flash graphene (Luong et al. Gram-scale bottom-up flash graphene synthesis, *Nature*, 2020, incorporated by reference herein), which uses flash Joule heating of inexpensive carbon-based materials or other carbon sources, such as coal, petroleum coke, biochar, carbon black, food waste, rubber tires and mixed plastic waste to convert the material to graphene. The carbon source is lightly compressed in a reaction vessel between two electrodes, and a high voltage discharge from a capacitor bank brings the carbon source material in the reaction vessel to at least 3000 K in less than 100 ms. The process converts the amorphous carbon in the carbon source into flash graphene. Yields in this process depend heavily on the carbon content of the starting material. In some embodiments, the carbon source material may be mixed with carbon black or another similar conductive material to improve the conductivity of the material. In some embodiments, the flash graphene has an average particle size of less than 20 nm. In some embodiments, the flash graphene is produced in the form of larger, but thin sheets of average size of 0.5 to 1.2 μm.

The graphene starting material may adopt various morphologies, but preferably is in the form of ramified fractal aggregates, nanosheets, crystalline flakes, nanoplatelets and platelet chains, as single or multilayer graphene, and can be generally characterized macroscopically as a fluffy or fuzzy black powder or particulate material of high purity (≥98.5% carbon). In other words, the graphene starting material is preferably essentially free of graphite or graphite oxide. The particulates are preferably nanosized and generally have a maximum surface-to-surface dimension of about 350 nm, preferably about 20 nm to about 100 nm. The particulates can be observed under an electron microscope as thin monolayers entangled with each other with overlapped edges, or more ordered stacking of nanosheets comprising or consisting of two to three layers, but potentially up to 15 layers, preferably from 1 to 10 layers, more preferably 1 to 5 layers, even more preferably 1 to 2 or 3 layers, up to 5 layers. Thus, graphene for use in the invention is highly pure, aka pristine, and is essentially free (i.e., less than 0.5%, preferably less than 0.1%) of foreign substances and impurities, with a carbon content of at least about 98.5%, and preferably at least 99% (and conversely an oxygen content of less than 1%).

Figure 3:
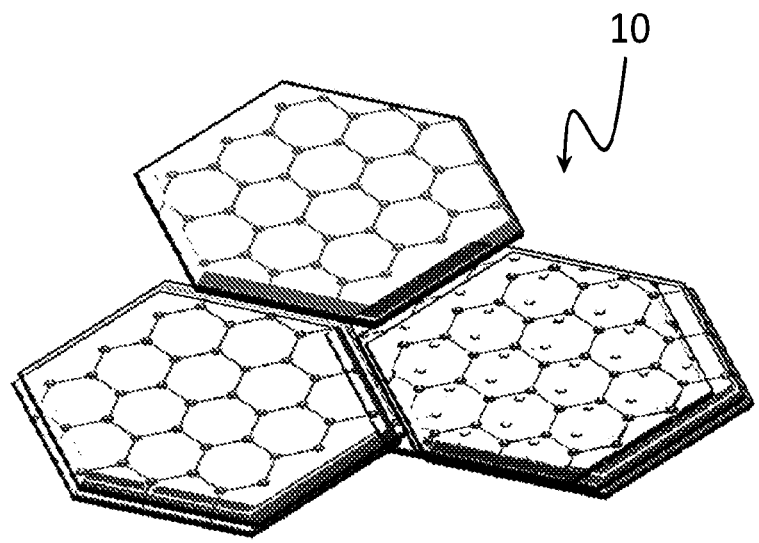
FIG. 3 is an illustration of multi-layered fractal aggregates of Fenton-oxidized graphene.
Figure 4:
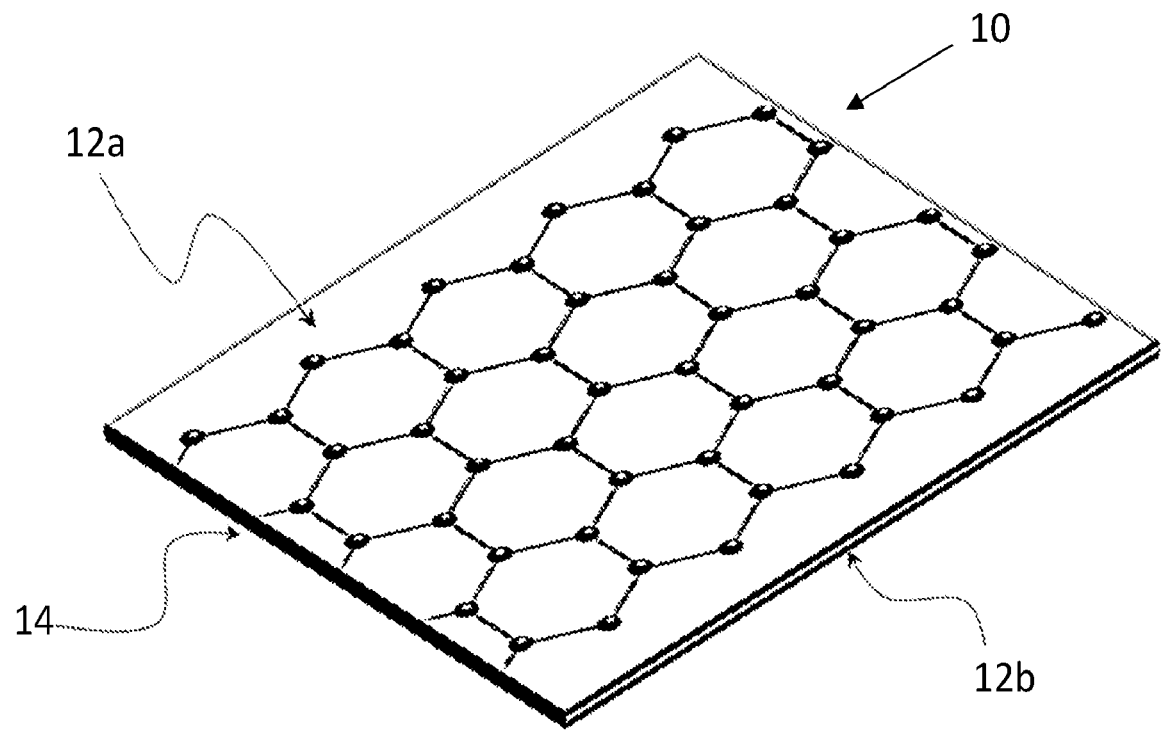
FIG. 4 is an enlarged view of a multi-layered graphene core with graphene oxide exemplifying graphene/graphene oxide core/shell particles comprising a chemically intact graphene core and an amorphous shell of graphene oxidation products (carboxylic acids, ketones and possibly hydroxyl groups) at the surface of intact layered graphene sheets.
Figure 5:
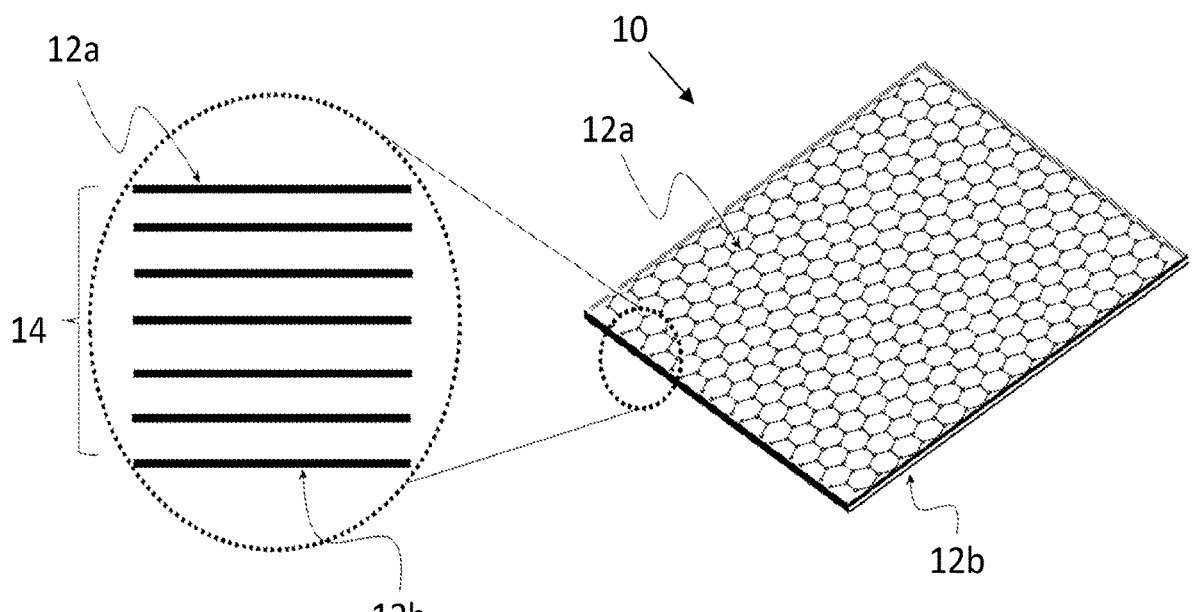
FIG. 5 shows an enlarged side view of a multi-layered graphene core with graphene oxide surfaces.

The pristine graphene particulates are oxidized under mild Fenton oxidation conditions and temperatures of less than 100° C. (preferably less than 80° C., more preferably less than 75° C.) to yield G/GO particulates, each comprising (consisting essentially, or even consisting of) a substantially pure and intact graphene core and a thin graphene oxide surface coating or shell. A plurality of G/GO particulates in the form of fractal aggregates are depicted in FIG. 3. FIG. 4 and FIG. 5 provide exaggerated illustrations of particulates 10 having an oxidized surface 12a, 12b, and a virtually intact graphene core 14. See also FIG. 6A.

Figure 6A:
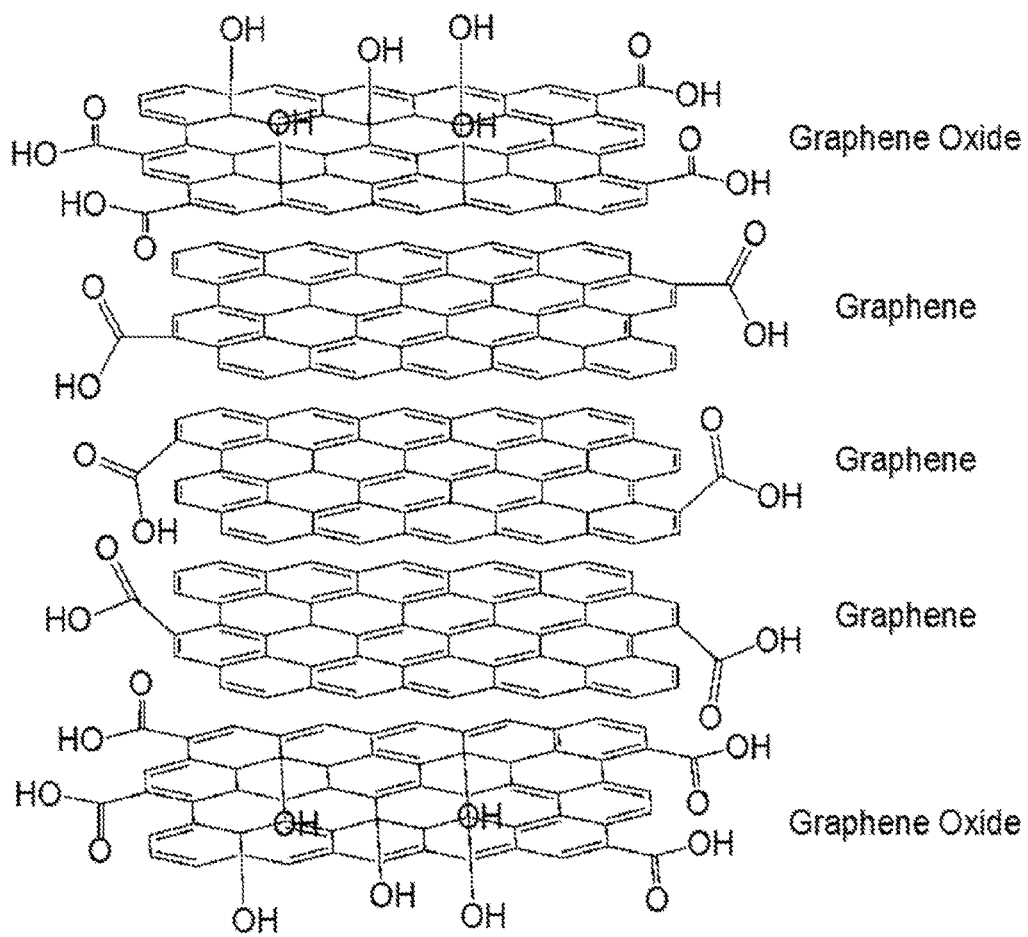
FIG. 6A depicts a cross-section illustration showing the core/shell structure of three layers of graphene (core) and respective outer layers of graphene oxide (shell), with —OH groups on the planar surfaces and —COOH groups on the edges. From FTIR and titration, —COOH appears to be the major functional group (>90%), although it will be appreciated that some -OH groups may also be present on the edges.
Figure 6B:
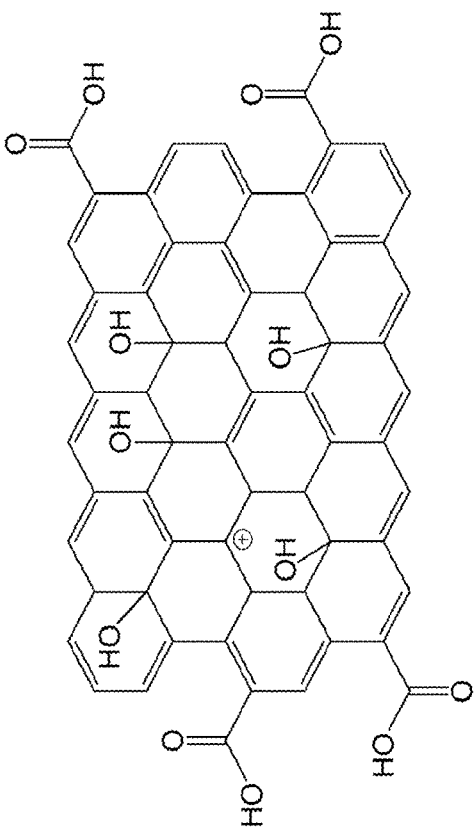
FIG. 6B depicts the Fenton oxidation of graphene to graphene oxide.
Figure 6B:
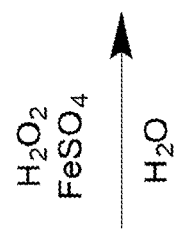
Figure 6B:
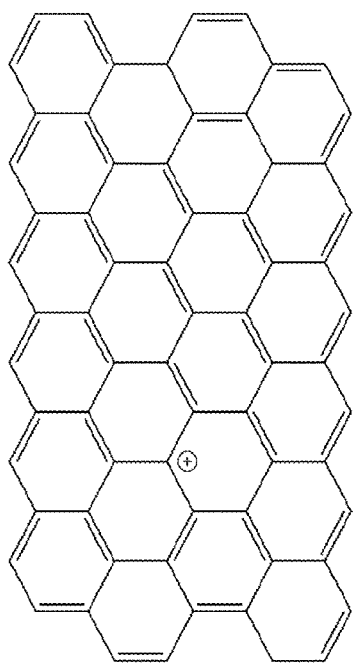

The oxidation method generally involves preparing a reaction solution comprising an aqueous solvent system at a low pH (preferably less than 5.0, preferably from about 2.5 to about 4.0, more preferably from about 2.8 to about 3.2 and even more preferably about 3.0). The reaction solution comprises from about 2.5% to about 25% w/w (preferably 2.5% w/w to about 15% w/w) hydrogen peroxide as the oxidizing agent, and from about 0.1% to about 10% w/w (preferably from about 1% to about 8% w/w) of the pristine graphene particulates. The reaction solution is stirred or agitated for a period of time to disperse the graphene particulates in the solvent system, and yield a substantially homogenous dispersion of the particulates. A suitable acid system can be used to reduce the pH of the solution as needed. Once the graphene particulates are dispersed, a source of iron, such as ferrous iron ferrous iron (typically iron(II) sulfate, $FeSO_4$) hydrate, ferric iron, or ferrate, is added to the reaction solution as the catalyst in an amount of from about 0.005% to about 5% w/w (preferably from about 0.05% to about 2.5% w/w). The reaction solution is stirred or agitated for a period of time to generate a hydroperoxyl radical, which reacts with the graphene carbon to oxidize the particulate surfaces in solution. Typically, the reaction solution is stirred for a period of from about 1 hour to about 24 hours, preferable at least about 1 hour, preferably at least about 10 hours, and more preferably about 24 hours. During the process, the reaction solution is preferably maintained at a temperature of 100° C. or less, preferably from about 0° C. to about 100° C., preferably from about 25° C. to about 85° C., and more preferably from about 40° C. to about 75° C. A reaction process is depicted in FIG. 6B.

The resulting oxidation product (G/GO particulates) are then removed from the reaction solution, e.g., by filtration and/or centrifugation. The collected G/GO particulates are preferably washed in an aqueous solvent system to neutralize the reaction until a neutral pH of above 6 is obtained in the supernatant. The G/GO particulates can be dried, e.g., under vacuum desiccation, or lyophilized, and stored until further use. The resulting G/GO particulates can be characterized as being composed of a virtually intact graphene core with an oxidized surface, characterized as a thin GO shell (FIG. 6A). This means that there is very little change in the spacing of the d-spacing and lattice spacing of the graphene in the core as compared to the starting material. Further, the resulting G/GO particulates comprise at least 85% carbon, preferably at least 90% carbon, more preferably at least 92% carbon, even more preferably from about 92-98% carbon. Likewise, the G/GO particulates comprise up to 15% oxygen (~0.5%45%), preferably up to 10% oxygen (~0.5%40%), more preferably from about 1% to about 8% oxygen, and preferably from about 3 to about 4% oxygen. In other words, it will be appreciated that the starting graphene material has been oxidized "just enough" to functionalize the surface with a thin oxidized layer, and impart the favorable characteristics of a functionalized and water-dispersible material (e.g., carboxylic acid, ketone, and/or alcohol surface groups), while otherwise retaining the various advantageous characteristic of graphene throughout the body/core of each particulate.

In one or more embodiments, the process conditions can be adjusted to achieve different properties in the resulting G/GO particulates, such as to vary the surface oxygen content of the oxidized graphene and/or change the surface charge (zeta potential). For example, increased surface oxygen content (>8%) can be achieved by increasing the amount of iron source and increasing the reaction temperature, e.g., 3% w/w $H_2O_2$ and 0.125% w/w $FeSO_4 \times 7H_2O$ at 60° C. Similarly, a decreased surface oxygen content (<3%) can be achieved by decreasing the amount of iron source and lowering the reaction temperature, e.g., 3% w/w $H_2O_2$ and 0.05% w/w $FeSO_4 \times 7H_2O$ at 50° C. An increased zeta potential (>+14 mV) can be achieved by using lower temperatures and decreasing the amount of iron source, e.g., 3% w/w $H_2O_2$ and 0.15% w/w $FeSO_4 \times 7 H_2O$ at 50° C., while the zeta potential can be decreased (<−5 mV) by using higher temperature and slightly more iron source, e.g., 3% w/w $H_2O_2$ and 0.125% w/w $FeSO_4 \times 7H_2O$ at 60° C. It will be appreciated that the overall zeta potential will also be impacted by the initial zeta potential of the starting pristine graphene material. Different stoichiometric mixtures of materials used for synthesizing the detonation graphene starting material leads to graphene with different zeta potentials.

Figure 7:
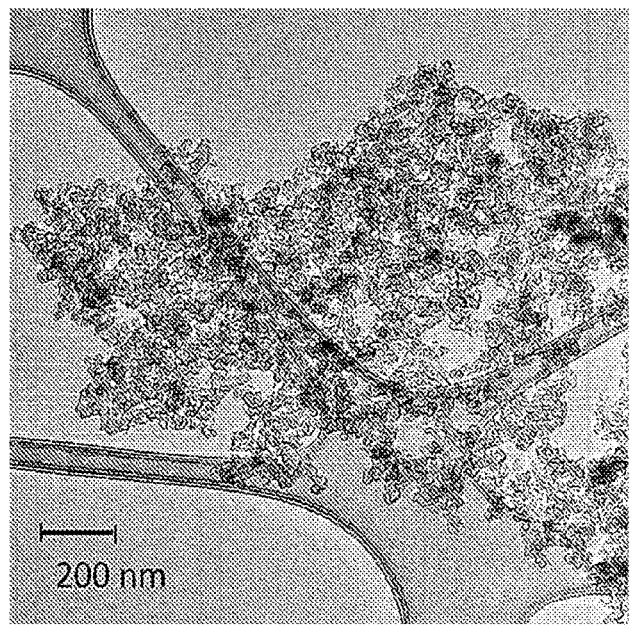
FIG. 7 is a transmission electron microscopy (TEM) image of the pristine detonation-synthesized graphene fractal aggregates used as starting materials.
Figure 8:
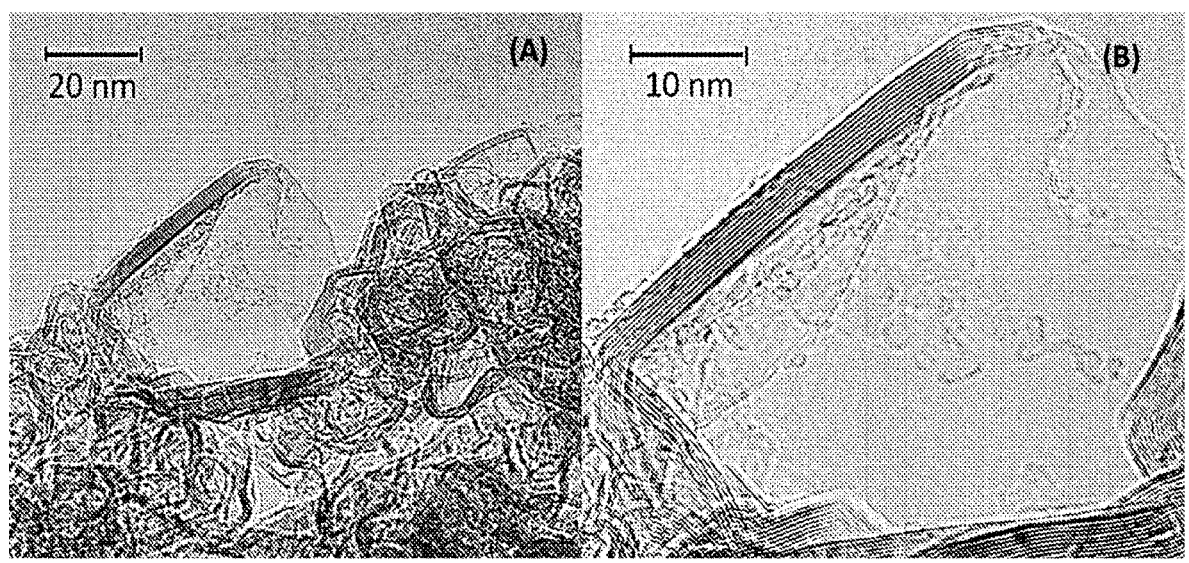
FIG. 8 shows enlarged TEM images from FIG. 8 at (A) 20 nm scale and (B) 10 nm scale, showing the coexistence of ordered and disordered regions of layered graphene. This particular structure shows at least 10 graphene layers that are stacked upon each other.
Figure 9:
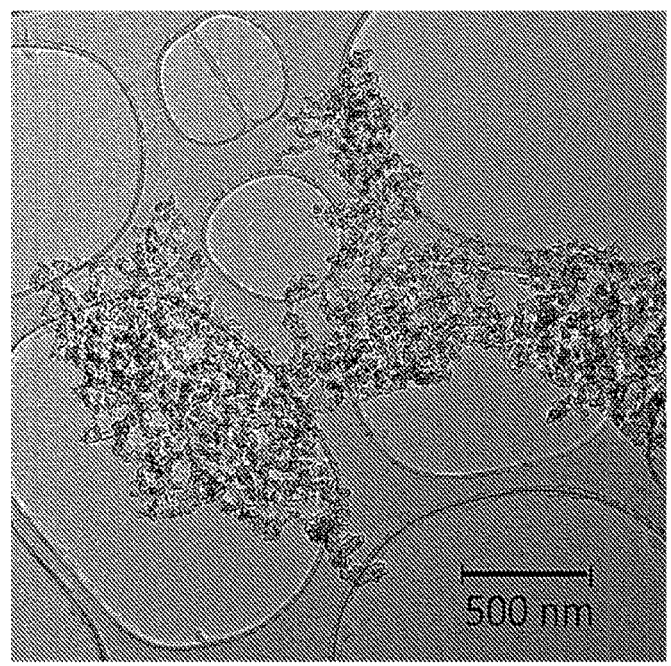
FIG. 9 is a TEM image of Fenton-oxidized graphene fractal aggregates. After Fenton-oxidation, the general structure of the material is virtually unchanged. The oxidized material exhibits a very similar structure of ordered and disordered regions of layered graphene.
Figure 10:
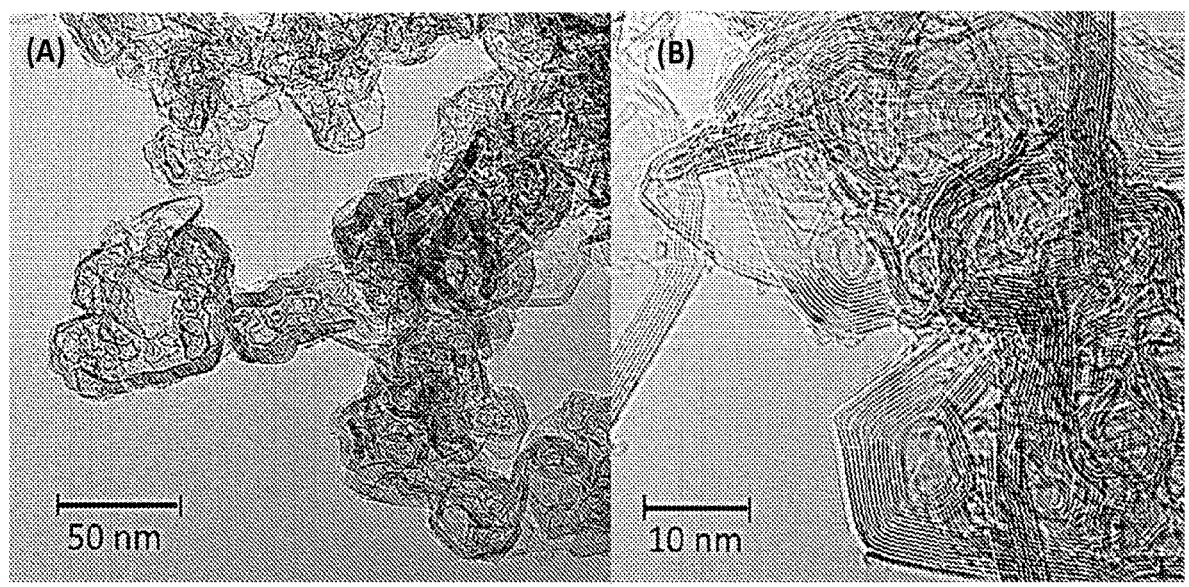
FIG. 10 shows enlarged TEM images at (A) 50 nm scale and (B) 10 nm scale, showing the coexistence of ordered and disordered regions of layered graphene, similar to the starting material.
Figure 11:
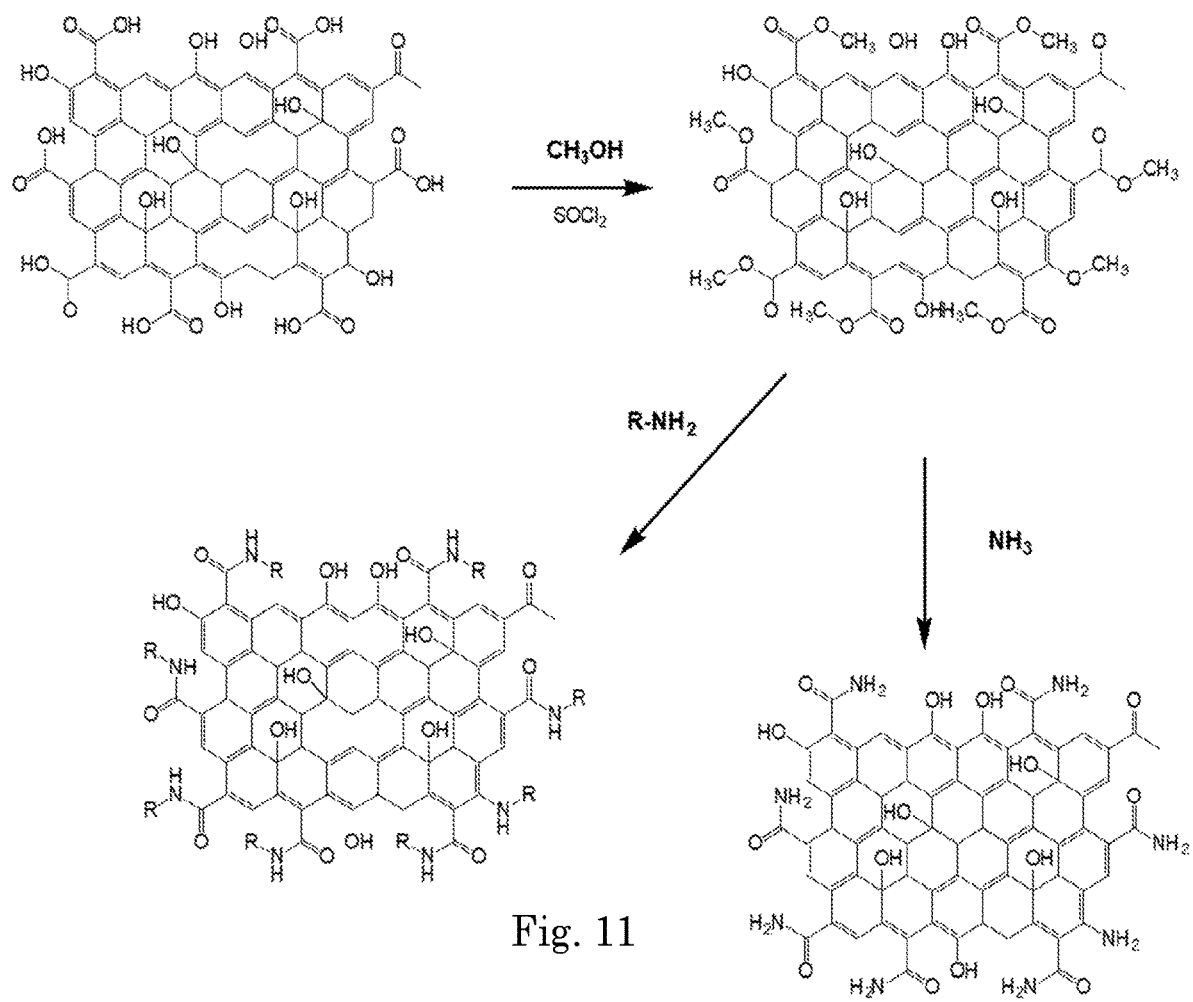
FIG. 11 depicts the general reactions of graphene oxide and graphene oxide methyl ester, where R denotes a variable moiety depending upon the primary amine used for the reaction.

Advantageously, the morphology of the starting graphene particulates is substantially retained in the G/GO particulates, such that the G/GO particulates are in the form of ramified fractal aggregates, nanosheets, crystalline flakes, nanoplatelets and platelet chains, as single or multilayer graphene, and can be generally characterized macroscopically as a fluffy or fuzzy black powder or particulate G/GO material of high purity. This is illustrated in the TEM images in FIG. 7-10. FIGS. 7-8 show TEM images of pristine detonation graphene. As can be seen from the TEM images in FIGS. 9 and 10, the morphology of the starting graphene particulates is substantially retained in the resulting G/GO particulates produced according to the invention. The particle size of G/GO individual particulates generally ranges from about 20 nm to about 100 nm (where the "size" is the maximum cross-section surface-to-surface dimension of the particulate, e.g., diameter).

The G/GO particulates prepared in this manner have good water dispersibility, of at least about 5 mg/mL, preferably from about 5 mg/mL to about 20 mg/mL, and more preferably from about 10 mg/mL to about 20 mg/mL. G/GO particulates prepared in this manner also have high thermal stability up to about 550° C., and only demonstrate a small weight loss (~3.5%) at temperatures of up to 600° C. In other words, the particulates are thermally stable and exhibit no thermal degradation at temperatures above 100° C., preferably above 200° C., more preferably above 300° C., more preferably above 400° C., and even more preferably above 500° C. (up to up to about 550° C.). The G/GO particulates also have broad absorption spectrums ranging from 200 nm to about 1400 nm, which would be particularly useful in hyperthermic applications, such as therapeutic and/or theranostic technologies.

It will be appreciated that the process and resulting products avoid harsh chemicals and waste products required in the prior art. For example, the graphene does not undergo exfoliation in the method, such that the G/GO particulates are essentially free of intercalants, such as sulfuric acid. Further, the G/GO particulates are essentially free of other contaminants and impurities, such as sodium and/or potassium ions, and the like. As used herein, "essentially free" means less than 0.1% by weight, preferably less than 0.05% by weight, and more preferably less than 0.01% by weight, based upon the total weight of the particulates taken as 100% by weight Also contemplated herein are various uses for the G/GO particulates and resulting products. For example, the G/GO particulates can be deposited as layers or thin films to prepare conductive films, such as flexible electronics, solar cells, chemical sensors, battery electrodes, capacitors, and the like. The G/GO particulates can also be dispersed with various polymers and fillers to prepare a wide variety of enhanced composites. Further, the G/GO particulates can act as filtration media or molded into a filtration membrane. The G/GO particulates can be molded and sintered to create graphene foams. It will be appreciated that the oxide layer can be removed, if desired. In one or more embodiments, the oxidized layer of the G/GO particulates can be removed by heating, for example, to allow synthesis of layered graphene aggregates.

Alternatively, the surface groups of the oxide layer can be further reacted, modified, or functionalized depending upon the desired use, to create a wide variety of new materials (e.g., GO derivatives). For example, the carboxylic acid groups on the oxidized surface can be reacted with a wide variety of organic or inorganic materials. In one or more embodiments, reaction of the graphene oxide surface layer with methanol under various conditions, including in the presence of thionyl chloride, yields GO methyl esters (mGO). The methyl groups can be substituted with ammonia ($NH_3$) or primary amines (R—$NH_2$, R=$C_1$ to $C_8$ alkyl, e.g., $CH_3$ to $C_8H_{20}$) by heating in an organic solvent (THF, hexane, DMF, ammonium hydroxide, etc.) to yield, for example graphene oxide amides, graphene oxide diethylamides, carboxyl amides of graphene oxide, carboxyl butyl amides of graphene oxide, and the like. Similarly, mGO can be reacted with ethylene glycol to form graphene oxide diethylene glycol ester (degGO). Exemplary reaction schemes are described in the working examples. Additional mGO derivatives can be prepared as described in more detail below. Surface-modified or functionalized G/GO particulates can be used in the preparation of composite compositions, such as by dispersing the surface-modified or functionalized G/GO particulates in a resin matrix or cement alone or in combination with reinforcing fibers (e.g., fiberglass) and/or aggregate materials, such as sand, stone, gravel, rock, and the like. Surface-modified or functionalized G/GO particulates can also be reacted with various monomers to yield composite polymers having improved properties with the G/GO particulates integrated therein.

Surface-modified or functionalized G/GO particulates can also be further functionalized with various moieties, including, without limitation, antibodies, aptamers, peptides, and the like. These new materials find use in a variety of technologies for biochemical or biosensing applications, including by using electrical impedance measurements Advantageously, after reduction, removal, or chemical reaction of the graphene oxide shell, the remaining graphite core possesses the mechanical and electrical properties of graphene. Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

The Fenton Reaction, an Advanced Oxidation Process

The key reaction of the thermal Fenton reaction is between iron(II) and hydrogen peroxide in aqueous solution. The observed reaction kinetics of $H_2O_2$ consumption shows an exponential dependence on the temperature. Depending on the substrate and possible chelation of iron(II), there are two competing main reactions:

$$Fe^{2+} + H_2O_2 \rightarrow Fe^{3+} + HO^\bullet + HO^- \quad (1)$$

$$Fe^{2+} + H_2O_2 \rightarrow FeO^{2+} + H_2O \quad (2)$$

In reaction (1), the hydroxyl radical is formed via electron transfer from iron(II) to $H_2O_2$. In reaction (2), an oxoiron(IV) species is formed. Note that the water molecules that are participating in these reactions are not shown to permit more clarity. Hydroxyl radicals react either (a) via hydrogen abstraction, which is not likely here due to the low hydrogen content of detonation-synthesized graphene, or (b) under electron transfer from graphene to the hydroxyl radical, or (c) under addition to carbon-carbon double bonds.

$$HO^\bullet + R-H \rightarrow H_2O + R^\bullet \quad (a)$$

$$HO^\bullet + R-H \rightarrow RH^+ + HO^- \quad (b)$$

$$HO^\bullet + C=C \rightarrow HO-C-C \quad (c)$$

All three reactions form organic radicals, which then react with oxygen (d) under formation of peroxyl radicals, which further react to eventually form ketones or carboxylic acids.

$$R^\bullet + O_2 \rightarrow R-O-O^\bullet \rightarrow \rightarrow \rightarrow R-COOH \text{ and other products} \quad (d)$$

The oxoiron(IV) species can live up to several seconds in aqueous solutions. It reacts by means of electron transfer with organic matter (e).

$$FeO^{2+} + R-H \rightarrow R^\bullet + Fe^{3+} + HO^- \quad (e)$$

This reaction is followed by addition of oxygen (d) and formation of carboxylic acids, ketones, and other oxidation products via peroxoradical chemistry.

In conclusion, both principal reaction pathways lead to the oxidation of graphene. Oxoiron(IV) is more effective than the hydroxyl radical, because the latter can recombine to hydrogen peroxide.

$$2HO^\bullet \rightarrow H_2O_2 \quad (f)$$

In addition to reacting with graphene, both reactive intermediates of the Fenton reaction are capable of reacting with $H_2O_2$.

$$HO^\bullet + H_2O_2 \rightarrow H_2O + HO_2^\bullet \quad (g)$$

$$FeO^{2+} + H_2O_2 \rightarrow Fe^{3+} + HO^- + HO_2^\bullet \quad (h)$$

As shown in Table 1, the hydroperoxyl radical ($HO_2^\bullet$) is a powerful oxidant. It reacts with organic matter, such as graphene, under hydrogen abstraction, electron transfer, and addition to formerly formed radicals.

Iron(III) is recycled via reaction with superoxide ($O_2^{\bullet-}$), the conjugate base of the hydroperoxyl radical ($HO_2^\bullet$) (pKa ($HO_2^\bullet/O_2^{\bullet-}$)=4.88[22]) (Haber-Weiss reaction). This step concludes the catalytic cycle of the Fenton reaction.

$$Fe^{3+} + O_2^{\bullet-} \rightarrow Fe^{2+} + O_2 \quad (i)$$

The intrinsic problem with complex reaction networks is that it is virtually impossible to predict the kinetics of graphene to graphene/graphene oxide. Therefore, we have applied Optimal Experimental Design Methodology to optimize the reaction conditions.

Fenton Oxidation of Graphene

The oxidation and optimization experiments reported here were performed in a 250 mL flask equipped with a motor-driven overhead stirrer and an electronic thermometer with a stainless-steel probe. The flask was immersed into a water bath that was kept at a precisely selected temperature (see Table 1). The flask was filled with 90.0 ml aqueous solution of pH=3.0 (sulfuric acid, Fisher Chemical) and allowed to stir until the temperature inside the flask reached the temperature of the external water bath (permitted $\Delta T=2$ K).

Next, 10.0 mL of 30% $H_2O_2$ (Acros Organics) was added to the flask and the mixture stirred for 5 min, followed by addition of 1.0 g of pristine graphene in the form of ramified fractal aggregates, nanosheets, and nanoplatelets (fluffy graphene powder, which is sometimes referred to as an aerosol gel). This graphene is prepared by detonation synthesis to yield a highly pure starting material. Each of these experiments used 0.3 graphene which refers to the oxygen to carbon molar rate in the $O_2/H_2C_2$ mixture used for synthesis (30% stoichiometric oxygen during the detonation, leading to a graphene with a zeta potential of +60.0 mV).

The resulting suspension was stirred until a dispersion was formed (approx. 10 min.). At this point, a defined amount of $FeSO_4 \times 7H_2O$ (Table 1) was added at once as a solid. The Fenton oxidation reaction solution was continuously stirred at the selected bath temperature for 24 h.

TABLE 1

Fenton reaction conditions, CHO Analysis and Zeta Potentials, First Round of Optimization Experiments

| Temp (° C.) | FeSO$_4$ × 7 H$_2$O (mg) | CHO Analysis* | Zeta Potential (mV) |
|---|---|---|---|
| — | — | 99.2% C, 0.1% H, 0.7% O | +60 |
| 40 | 75 | 94.3% C, 1.1% H, 4.6% O | +10.4 |
| 40 | 125 | 93.5% C, 1.4% H, 5.1% O | +9.6 |
| 50 | 50 | 96.3% C, 1.6% H, 2.1% O | +17.7 |
| 50 | 100 | 94.7% C, 1.2% H, 4.1% O | +11.9 |
| 50 | 150 | 95.4% C, 1.8% H, 3.9% O | +14.5 |
| 60 | 75 | 95.1% C, 1.5% H, 3.4% O | +13.1 |
| 60 | 125 | 90.1% C, 1.7% H, 8.2% O | −8.2 |
| 60 | 175 | 92.2% C, 1.6% H, 6.2% O | −5.8 |
| 70 | 100 | 92.4% C, 1.8% H, 5.8% O | −1.4 |
| 70 | 150 | 90.6% C, 1.9% H, 7.5% O | −5.8 |

*performed by ALS Environmental, Tucson, AZ.

Next, the oxidation product (graphene/graphene oxide (G/GO) core/shell particulates) was removed by filtration using either a Corning 3606060M glass filter (pore size 10 to 15 μm) or a GE Healthcare 1001030 (medium pore size) filter paper. Alternatively, the formed G/GO can be centrifuged off at 7000 RPM, 5 min. The obtained G/GO particulates were resuspended in 100 mL of bidest $H_2O$ and filtered off (or centrifuged off) again. This process was repeated until the pH of the supernatant was >6.0 (here: five times). The resulting G/GO particulates were dried in a vacuum desiccator for 24 h over $P_2O_5$, followed by storage in polyethylene or polypropylene containers at RT.

Typical yields were ranging from 75-80% (filtration) and 82-85% (centrifugation). The zeta potentials of graphene/graphene oxide obtained by means of filtration and centrifugation were virtually identical (±0.1 mV).

Characterization of the Reaction Products

Elemental (CHO) Analysis. CHO Analysis was carried out to indicate the oxidation of the graphene starting material. The extent of oxidation depends on the chosen process conditions (Table 1). Whereas other reports describe the synthesis of graphene oxide via classic Hummers method with a C/O ratio of down to 1:1, the C/O ratio reported here does not exceed 10:1. This finding can be regarded as experimental evidence for oxidation of an outer shell around the graphene particle, resulting in a graphene/graphene oxide core/shell nanoparticle.

Figure 12:
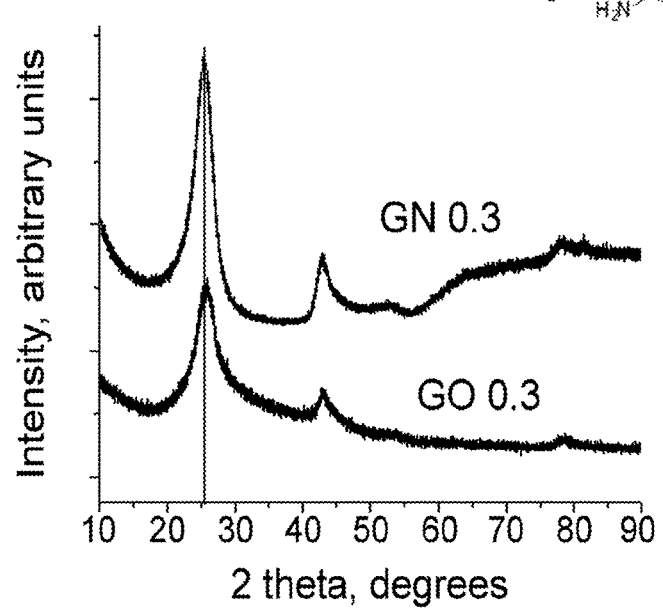
FIG. 12 is a graph of the comparison of XRD spectra of detonation-synthesized graphene (GN, 99.2% C, 0.1% H, 0.7% O, Table 1) and Fenton-oxidized graphene (GO, 90.1% C, 1.7% H, 8.2% O, Table 1).

X-Ray Powder Diffraction (XRD). As shown in FIG. 12, the position of most intense lines is virtually the same for graphene and Fenton-oxidized graphene oxide. Our conclusion is that there is no significant change (<0.05% change) in d-spacing between graphene layers in graphene and oxidized graphene. In contrast, graphene oxide that has been synthesized via oxidation of graphite or by means of Hummers method is known to feature increased d-spacing due to intercalation of sulfuric acid between graphene layers and subsequent oxidation, leading to a discernible left shift of the position of the peak with highest intensity. Since this effect is not observed, our conclusion is that no intercalation occurs during the synthesis. Based on the comparison of XRD spectra of graphene and oxidized graphene, our novel material possesses virtually intact graphene cores, which are surrounded by an amorphous graphene oxide shell.

Figure 13:
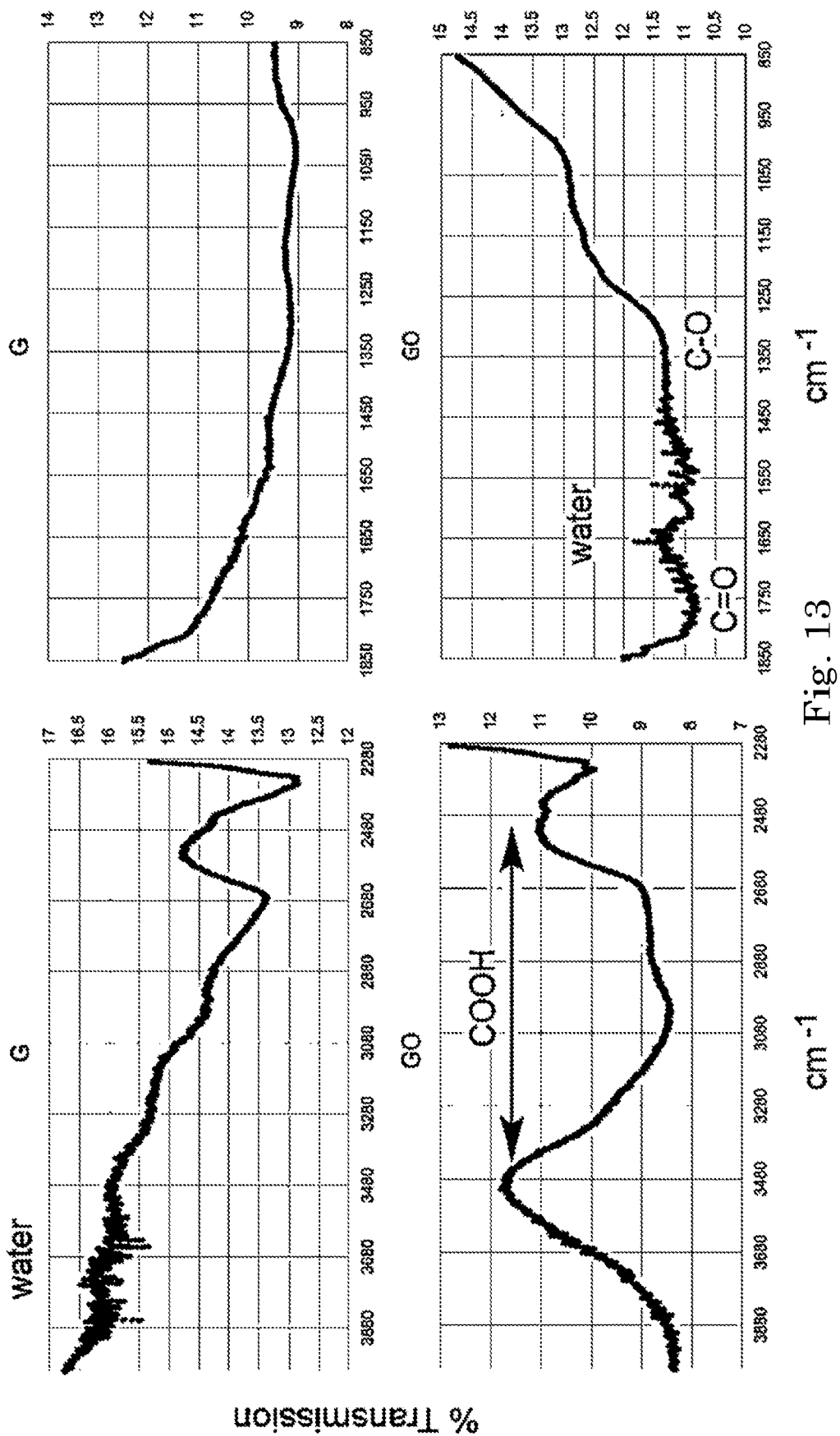
FIG. 13 shows graphs comparing FTIR transmission spectra of pristine detonation-synthesized graphene (99.2% C, 0.1% H, 0.7% O, Table 1, top spectra) and Fenton-oxidized graphene (90.1% C, 1.7% H, 8.2% O, Table 1, bottom spectra).

Fourier Transform Infrared Spectroscopy (FTIR). FTIR is ideal for detecting the presence of functional groups with permanent dipole moment in a material. As shown in FIG. 13, there are significant differences between the powder FTIR spectra of detonation-synthesized graphene (99.2% C, 0.1% H, 0.7% O) and Fenton-oxidized graphene (90.1% C, 1.7% H, 8.2% O). The high-energy FTIR window of the Fenton-oxidized graphene is dominated by the signal of the —COOH group (3500-2500 $cm^{-1}$), which is completely absent in graphene. In the low-energy FTIR window, a broad C=O absorption band (1800-1680 $cm^{-1}$) and a shoulder around 1330 $cm^{-1}$, indicating the presence of C—O—H functions, are discernible for Fenton-oxidized graphene, but not for graphene before oxidation. From the FTIR data, we have concluded that Fenton-oxidation produces carboxylic acid groups and potentially other oxidation products (e.g. ketones and alcohols) at the outside of the graphene particles. This finding corroborates the paradigm of the formation of graphene/graphene oxide core/shell particles during Fenton-oxidation of graphene.

Zeta Potential Measurements. The data clearly indicate the chemical changes at the surface of Fenton-oxidized graphene. Whereas the zeta potential of pristine detonation-synthesized graphene in $H_2O$ (pH=7.0) is +60 mV (Table 1), it decreases to +17.7 to −8.2 mV for Fenton-oxidized graphene, depending on the actual oxidation conditions. In comparison with graphene oxide synthesized using Hummers method, which has a zeta potential of approx. −40 mV in water (pH=7.0), the data obtained for the oxidation method discussed here is distinctly different, which is indicative of a different oxidized structure that is obtained via Fenton-oxidation of graphene. Less negative zeta potentials found in graphene oxide are in agreement with the explanation that graphene is not undergoing exfoliation during oxidation. Therefore, single graphene sheets of the multilayer graphene cannot become oxidized from both sides, resulting in lesser content of carboxylic acids in graphene oxide. The paradigm of graphene/graphene oxide core shell particles fits also this experimental observation best.

Figure 14:
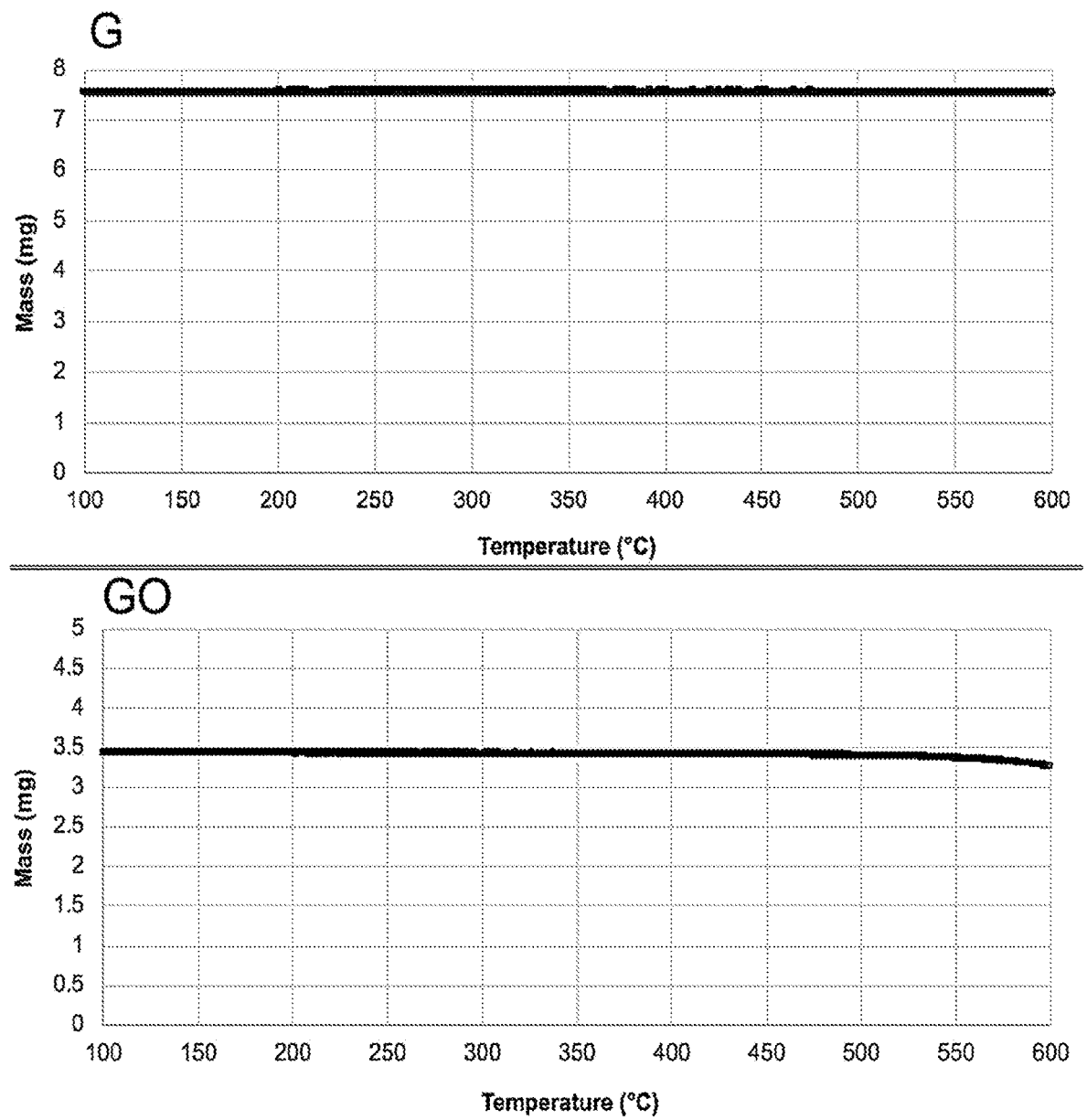
FIG. 14 shows graphs comparing the thermogravimetric behavior of graphene (G: 99.2% C, 0.1% H, 0.7% O, Table 1) and Fenton-oxidized graphene oxide (GO: 90.1% C, 1.7% H, 8.2% O, Table 1).

Thermogravimetry. The thermal (and mechanical) stability of graphene-derivatives is of very high importance with respect to their use in novel materials. The higher the thermal (and mechanical) stability of graphene oxides, the more suitable these materials are for composite materials. Graphene is known to exhibit excellent thermostability up to 900° C., whereas classically synthesized graphene oxide undergoes decomposition between 200° C. and 400° C., depending on the extent of oxidation. The mass of graphene oxide that was synthesized via Fenton oxidation decreases only between 3.5% by weight (FIGS. 14) and 5% (other oxidation conditions, not shown) when heated to 600° C. Most importantly, this process starts at 550° C., which is significantly higher than for other graphene oxides. It must be noted that below 100° C. a variable mass loss (up to 7% by weight) is observed for Fenton-oxidized graphene oxide, which was attributed to physisorbed water and low molecular weight oxidation products. As shown in FIG. 14, whereas a slight increase of weight can be discerned for graphene, due to minor oxidation at higher temperatures, Fenton-oxidized graphene oxide is thermally stable up to 550° C. At 600° C., a weight loss of 3.5% is observed. These results confirm the preservation of the graphene core in the formation of graphene/graphene oxide core/shell particles.

Example 2

Optimization of the Fenton Oxidation of Detonation-Synthesized Graphene to Graphene/Graphene Oxide Core/Shell Particles Optimal Experimental Design Methodology (OEDM)

In order to optimize the Fenton oxidation conditions of graphene, the effects of two main process variables ($U_i$) on oxygen content, as measured by CHO analysis, and zeta potential of the obtained graphene/graphene oxide core/shell nanoparticles (experimental responses $R_1$ and $R_2$) were determined: (I) concentration of iron(II)sulfate ($U_1$, milligrams per 100 ml aqueous $H_2O_2$ solution, pH=3.0) and (II) reaction temperature ($U_2$, ° C.). OEDM was used for designing an experimental matrix that is able to provide meaningful results with a minimum of experiments required. OEDM is based on multivariate models where experimental settings of independent variables are concurrently modified in a manner that an experimental matrix is shaped that permits statistically significant modelling and prediction of optimized variables. We have selected the so-called Doehlert matrix, which provides a very easy approach to optimized process parameters. In this design, the independent variables $U_i$ are normalized. The center variable $x_i$ defined as $$x_i = \frac{(U_i - U_{i,0})}{\Delta U_i}$$

where $U_{i,0}=(U_{i,max}+U_{i,min})/2$ is the value of $U_i$ at the center of the experimental region (Doehlert hexagon). $\Delta U_i$ is defined as $(U_{i,max}-U_{i,min})/2$. For a Doehlert matrix, the dependent variable $Y=f(x_i)$ is represented by a quadratic polynomial model.

$$Y=b_0+b_1x_1+b_2x_2+b_{11}x_1^2+b_{22}x_2^2+b_{12}x_1x_2$$

In the case of two independent variables, the Doehlert matrix contains 7 uniformly distributed experiments that form a hexagon containing a center variable. The experiment in the center has to be repeated at least three times to ascertain the statistical reproducibility of the results. We used the program package DESIGN Expert 2 to calculate the coefficients of the polynomial model and the resulting surface response by applying the least-squares method, as well as F-tests to ascertain the validity of the quadratic polynomial model. ANOVA analysis for the model shown in FIG. 15(A) resulted in a p-value of <0.0001 (significant). The final response equation for this model is:

$$R_1 = 415.2 - 1.64778\ A - 9.77281\ B + 0.004744\ AB + 0.004752\ A^2 + 0.071956\ B^2$$

Figure 15:
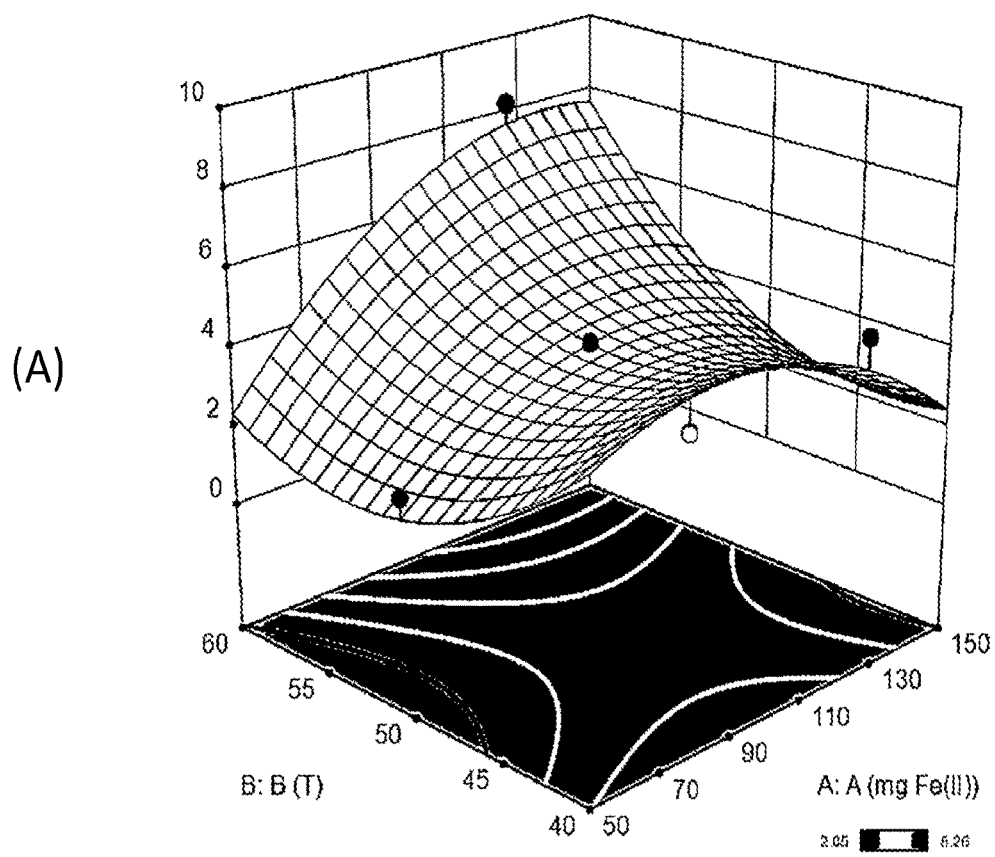
FIG. 15 shows graphs for the (A) response surface of Doehlert matrix 1 (catalyst variation: 50 to 150 mg $FeSO_4 \times 7H_2O$; temperature variation: 40 to 60° C.); and (B) response surface of Doehlert matrix 2 (catalyst variation: 50 to 150 mg $FeSO_4 \times 7H_2O$; temperature variation: 50 to 70° C.).
Figure 15:
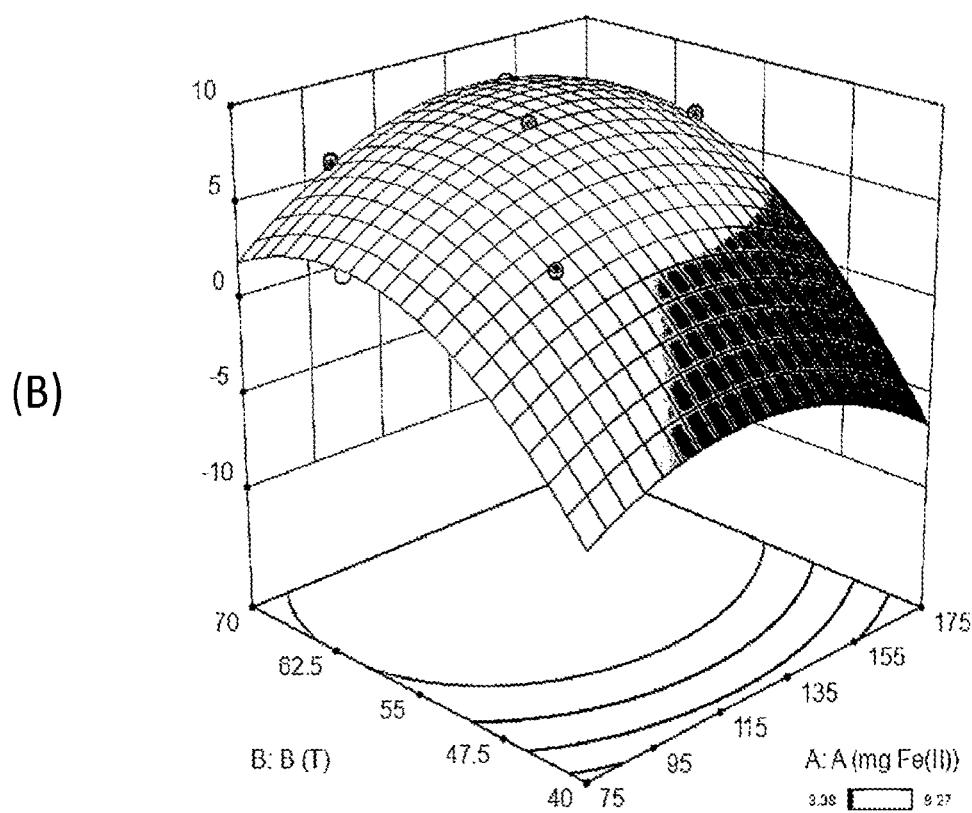

ANOVA analysis for the model shown in FIG. 15(B) resulted in a p-value of <0.0001 (significant). The final response equation for this model is:

$$R_1 = -82.42597 + 0.249511\ A + 2.31817\ B + 0.001930\ AB - 0.001365\ A^2 - 0.020212\ B^2$$

The second Doehlert optimization clearly shows a maximum close to 60° C. and 125 mg $FeSO_4 \times 7H_2O$.

XPS Measurement of Fenton-Oxidized Detonation Graphene (0.3). The Graphene Oxide particulates were characterized using an X-ray photoelectron spectroscopy (PHI 5000 VersaProbe II, Physical Electronics Inc.) at an ultra-high vacuum ($1 \times 10^{-9}$ bar) instrument with a monochromated Alk$\alpha$ X-ray source. The X-ray beam size was 100 µm and survey spectra were recorded with pass energy (PE) of 117 eV step size 1 eV and dwell time 20 ms, whereas high-energy resolution spectra were recorded with PE of 23 eV, step size 0.05 eV and dwell time 20 ms. Auto-z (i.e., automated height adjustment to the highest intensity) was performed before each measurement to find the analyzer's focal point. The number of average sweeps of each of the elements was adjusted to (5-25 sweeps) to obtain the optimal signal-to-noise ratio. The data collected from XPS acquisition was analyzed using a Multipak software tool. Three peaks corresponding to the O1s, C1s Fe2p3 were observed in the survey spectrum of GO (not shown). The atomic composition of the element was measured as 96.3, 3.2 and 0.5 percent for C, O and Fe respectively (not shown).

The C1s peak of GO was deconvoluted in order to analyze the other forms of the carbon and oxygen groups. The deconvolution showed the three components of carbon and oxygen groups at 286.2 (C—O), 284.67(C—C) and 284.38 ($sp^2$ C) eV (data not shown).

Comparison XPS Literature Data
  (1) O 1s 531.50 keV O—C=O
  (2) O 1s 532.34 keV C=O
  (3) O 1s 533.10 keV C—OH
  (4) O 1s 534.07 keV C—O—C The comparison with XPS literature data indicated the presence of carboxylic acids at the surface of the graphene/graphene oxide core/shell particles.

Chemical Surface Modifications of Graphene Oxide (GO) Derived from Detonation Graphene (G)

Reaction of graphene oxide from detonation graphene (Fenton method, GO) with methanol in the presence of thionyl chloride yields GO methyl esters (mGO, carboxyl methyl ester of graphene oxide from detonation graphene). The resulting materials have still negative zeta potentials (−20±5 mV). The presence of methyl groups and the disappearance of the —COOH groups can be discerned by means of Fourier-Transfer Infrared Spectroscopy. The methyl groups can be substituted either by ammonia ($NH_3$) or primary amines (R—$NH_2$, R=$CH_3$ to $C_8H_{20}$) by heating in an organic solvent (THF, hexane).

mGO synthesis: 500 mg GO from detonation graphene (0.3) were dispersed in 25 mL of anhydrous methanol by sonication for 5 min. After cooling on ice for 15 min., 4 mL of thionyl chloride ($SOCl_2$) were added dropwise. The solution was continuously stirred for 2 h and the heated to reflux for 1 h. After cooling to RT, mGO was harvested by centrifugation (7,000 RPM for 15 min.) and then re-dispersed in methanol and harvested again. This procedure was repeated two more times. mGO was then subjected to lyophilization to remove the remaining traces of methanol. (Yield: virtually quantitative) The thermostability of the material is excellent. Whereas the loss of mass of graphene oxide is approx. 3.5% in the temperature interval from 550 to 600° C., the loss of mass of the GO methyl ester is less than 1.0%. Furthermore, the loss of adsorbed water between room temperature and 100° C. was not observed as well.

GON synthesis: Carboxyl amide of graphene oxide from detonation graphene was synthesized by dispersing 100 mg of mGO in aqueous concentrated ammonia (33% $NH_3$ in $H_2O$) by sonication for 5 min. and then heated to reflux for 1h. After cooling to RT, GON was harvested by centrifugation (7,000 RPM for 15 min.) and then re-dispersed in methanol and harvested again. This procedure was repeated two more times. mGO was then subjected to lyophilization to remove the remaining traces of methanol. (Yield: virtually quantitative)

GONB synthesis: Carboxyl butyl amide of graphene oxide from detonation graphene was synthesized by dispersing 100 mg of mGO in 10 ml DMF containing 5% by weight of 1-butyl-amine by sonication for 5 min. and then heated to 120° C. for 1h. After cooling to RT, GONB was harvested by centrifugation (7,000 RPM for 15 min.) and then re-dispersed in methanol and harvested again. This procedure was repeated two more times. mGO was then subjected to lyophilization to remove the remaining traces of methanol. (Yield: virtually quantitative)

Chemical Stabilities of Chemical Graphene Oxide Derivatives

Figure 16:
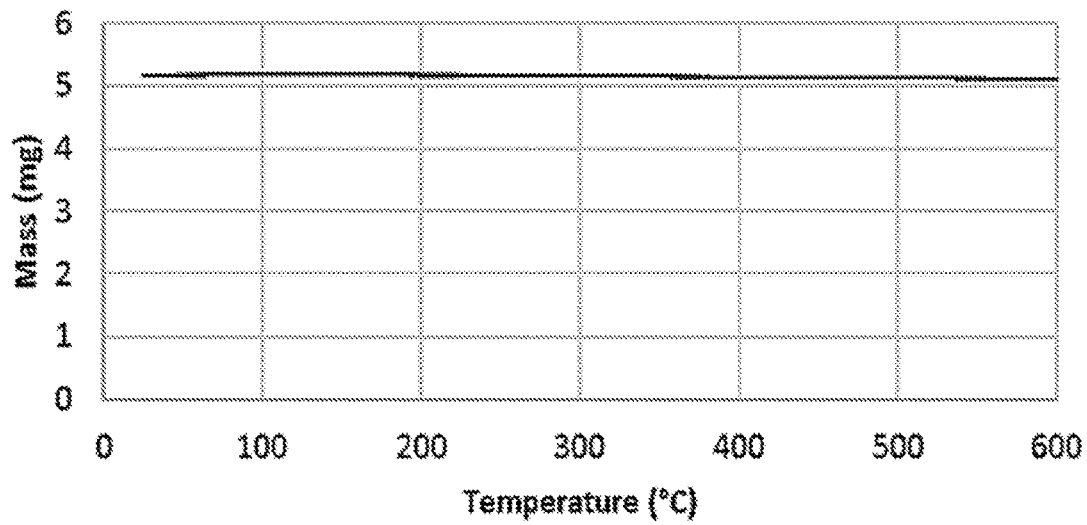
FIG. 16 is a graph of the thermogravimetric behavior of Fenton-oxidized graphene oxide (GO: 90.1% C, 1.7% H, 8.2% O) after converting the carboxylic acid groups to methyl esters.

The thermogravimetric behavior of all chemical graphene oxide derivatives discussed here is very similar. The thermal stability is increased compared to GO. The observed mass losses at 600° C. are less than 2.5%, as shown in FIG. 16.

UV/Vis Absorption Study of Graphene, Graphene Oxide and Graphene Carboxylamides

Figure 17:
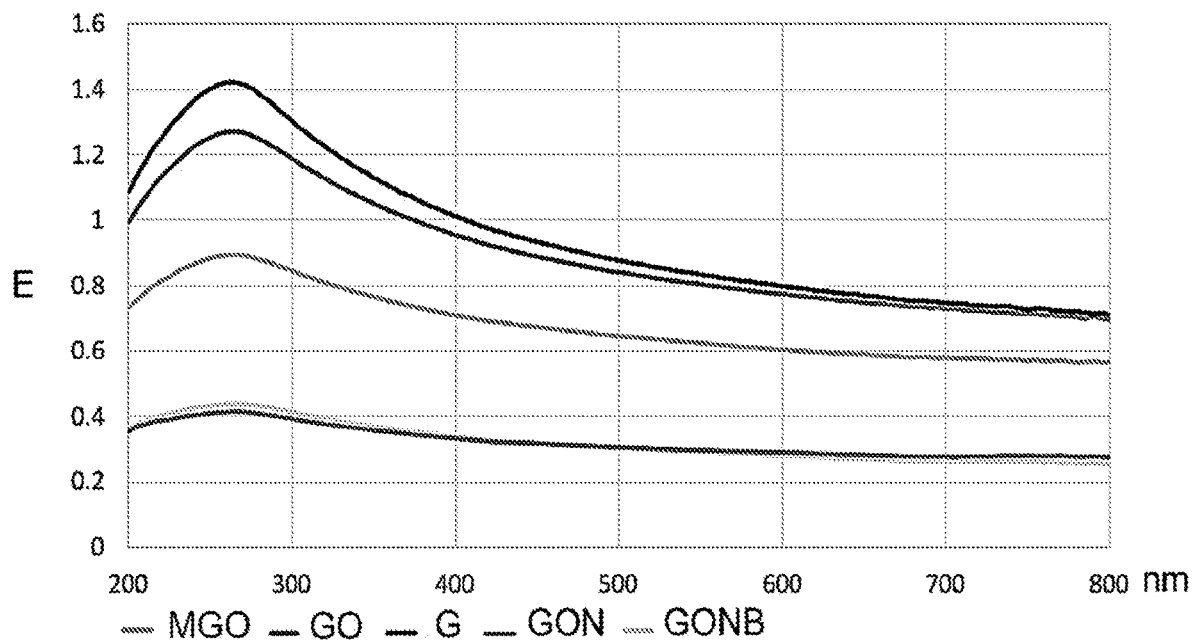
FIG. 17 is a graph showing that all graphene derivatives have a high optical extinction E.

As shown in FIG. 17, all graphene derivatives have a high optical extinction E, which permits photothermal applications in tissue at virtually any wavelength. However, wavelengths between 700 and 800 nm (and beyond) are preferred for in vivo applications (optical window region of biological tissue).

Dispersibilities of G, GO, mGO, GON, GONB in Water

Figure 18:
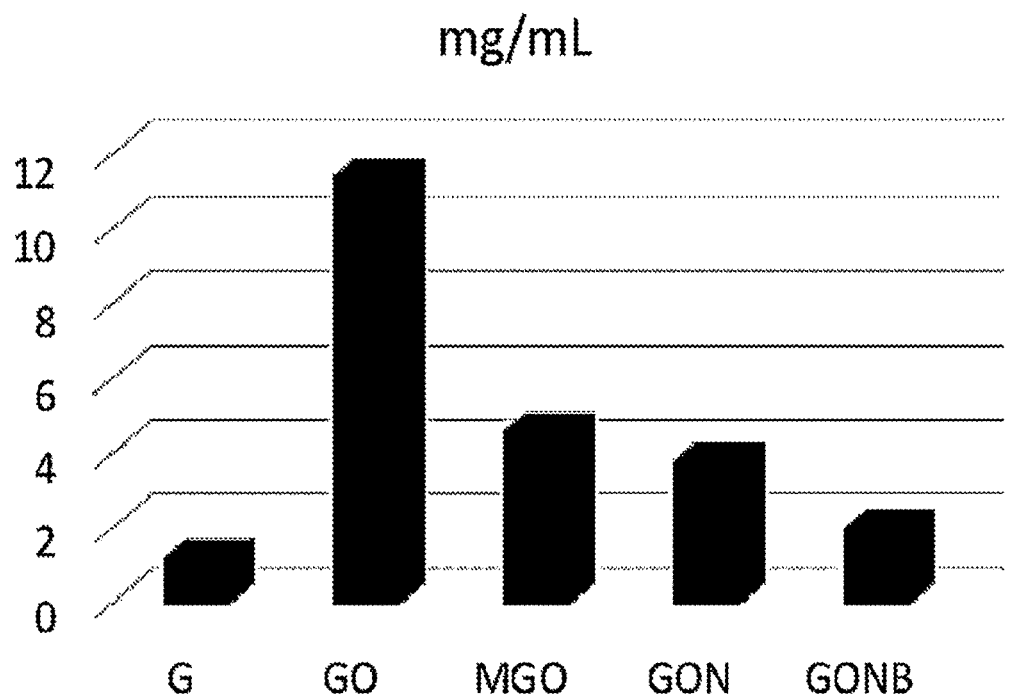
FIG. 18 is a graph showing dispersibilities of G, GO, mGO, GON, GONB in $H_2O$ at 20° C.

The dispersibilities of G, GO, mGO, GON, GONB in $H_2O$ were tested by sonicating appropriate masses in bidest. $H_2O$ for 15 min., a waiting period of 1h, giving the materials time to precipitate, followed by decanting of the solution and precipitation of the graphene-derivatives by means of centrifugation (7000 RPM for 30 min.). The results are shown in FIG. 18. It is noteworthy that mGO has an approximate dispersibility of 4.6 mg/mL, which enables chemical reactions of mGO in water. This finding opens the door to attaching all kinds of amine-derivatives, including (therapeutic peptide sequence and proteins (including antibodies and antibody fragments) to mGO via the exchange of methanol against amine-derivative.

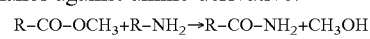

Cytotoxicity in Neural Progenitor Cells

Figure 19:
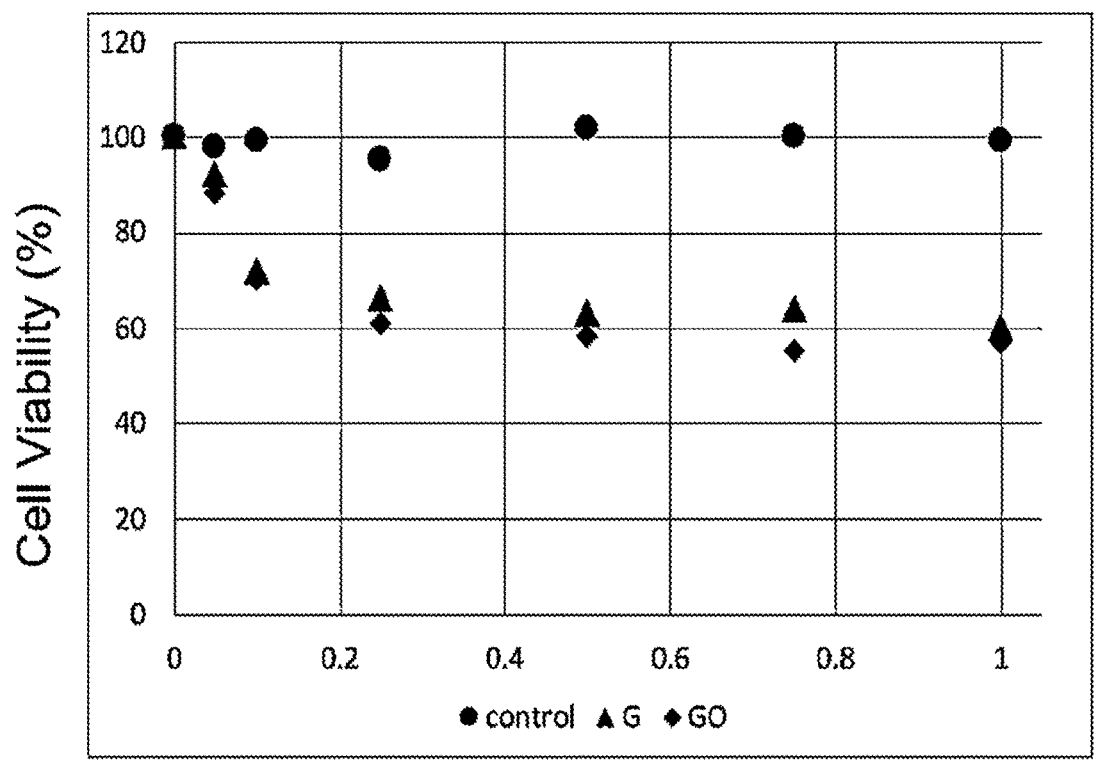
FIG. 19 is a graph showing cell viabilities of mouse neural progenitor cells after 24 h of incubation with graphene (G), graphene oxide (GO) vs. control group, as determined with MTT assay (MTT: 3-(4,5-dimethylthiazol-2-yl)-2,5-diphenyltetrazolium bromide). Relative error <3 percent.

The potential of detonation graphene and graphene oxide for biochemical and biosensing applications was estimated by incubation with mouse neural progenitor cells. As shown in FIG. 19, the cell viabilities decreased after 24 h of incubation with graphene and graphene oxide from 100% to about 60% at 0.25 mg per ml G and GO. Between 0.25 and 1.0 mg/ml of G and GO a plateau is reached after 24 h of incubation. Based on these initial experiments, both materials are very suitable for biochemical and biosensing applications.

Example 3

Upscaling Synthesis—Increased Batch Size and Synthesis of Additional GO Derivatives Further work has been carried out to upscale the synthesis conditions for producing larger batches of GO. Procedures have also been carried out to synthesize various functionalized derivatives of GO to tune the material properties.

Graphene Oxide Synthesis via Fenton Oxidation from Detonation Graphene

Figure 20:
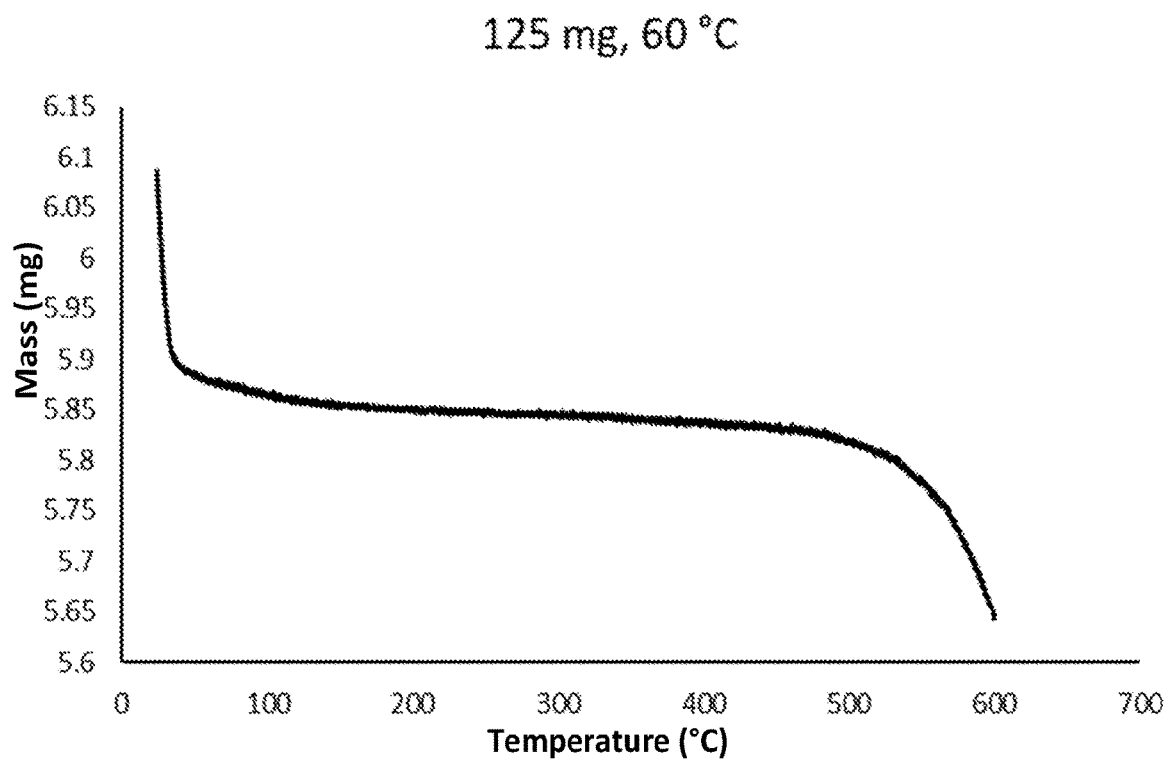
FIG. 20 is a graph showing Differential Thermogravimetry of graphene (under $N_2$). A significant weight loss occurs at T<50° C. (desorption of water) and T>500° C., indicating the superior thermal stability of core/shell graphene/graphene oxide compared to conventionally prepared graphene oxide (Hummers Method).

In this experiment, 0.4 detonation graphene (40% stoichiometric oxygen during the detonation) was used, which has a zeta potential, $\xi=16.26$ mV. To create the reaction solution, 1.0 g graphene 0.4 was added to 100 ml aqueous reactant (10 vol % $H_2O_2$ in water (pH=3, sulfuric acid)) in a 500 ml flask. The sample was sonicated until the graphene was dispersed in the aqueous reactant and then heated to 333 K. Minor foaming was observed. Then, 125 mg of solid $FeSO_4 \times 7H_2O$ were added at once. The mixture was stirred for 24 hours at 60° C. GO was collected via centrifugation (10 min @ 7000 rpm) and washed 5-7 times with water. Finally, GO was lyophilized to dryness overnight for characterization. Yield: 0.90 g (90%), zeta potential: $\xi=-8.2$ mV. As shown in FIG. 20, differential thermogravimetry analysis indicates a significant weight loss at T<50° C. (desorption of water) and T>500° C., indicating the superior thermal stability of core/shell graphene/graphene oxide compared to conventionally prepared graphene oxide (Hummers Method).

Upscaling of Graphene Oxide Synthesis from Detonation Graphene

Figure 21:
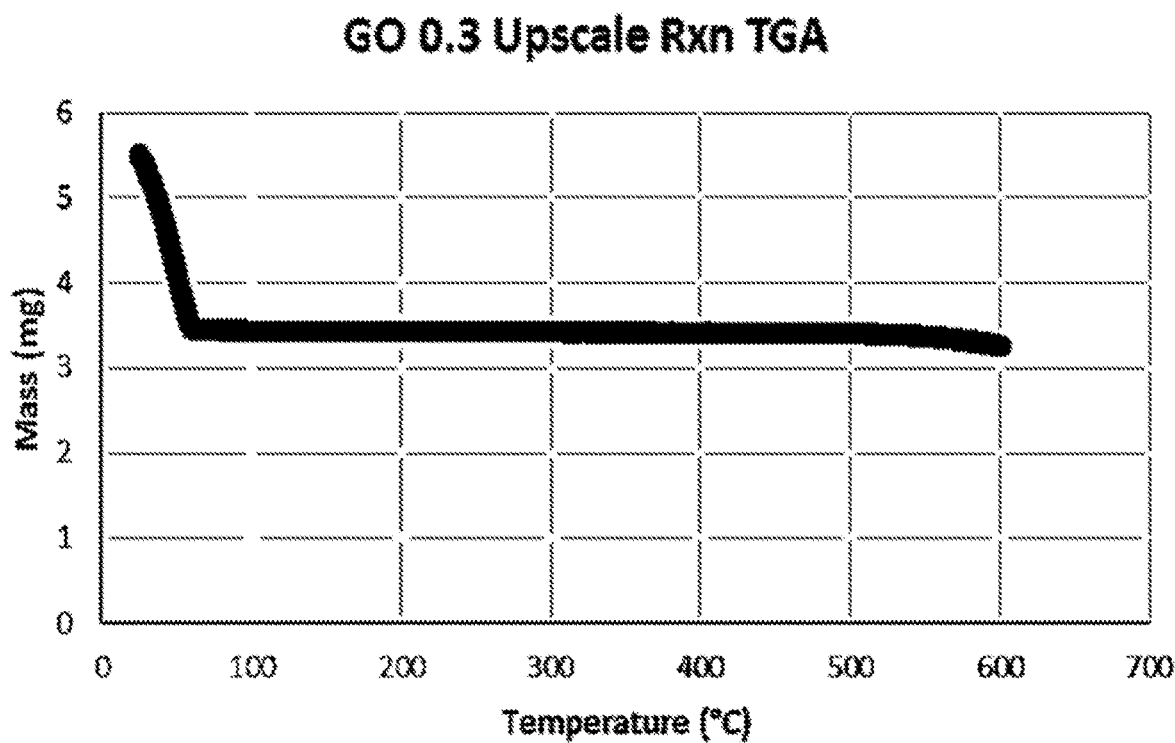
FIG. 21 is a graph showing Differential Thermogravimetry (TGA) of graphene (under N2). A significant weight loss occurs at T<60° C. (desorption of water).
Figure 22:
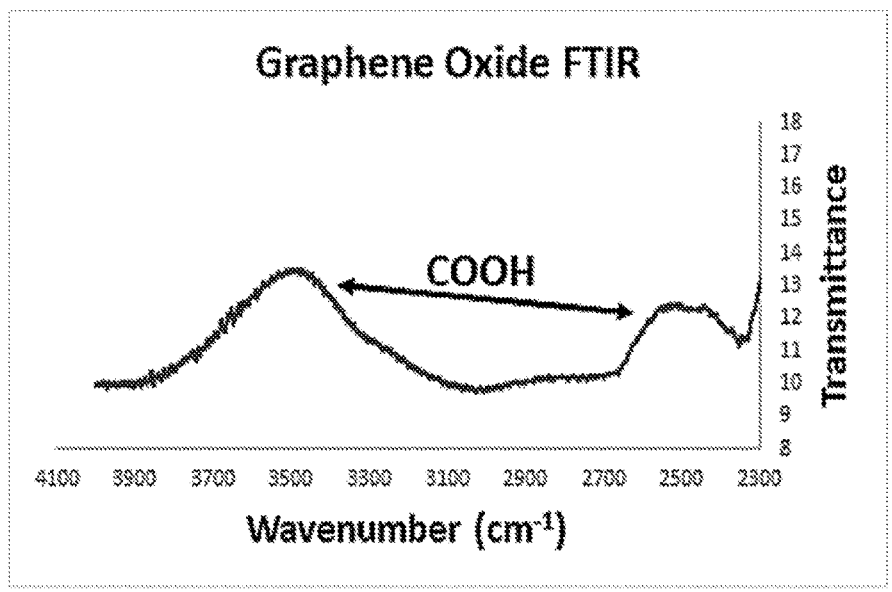
FIG. 22 is a graph showing FTIR of graphene oxide (large batch). The presence of a carboxylic acid group is clearly discernible.

In this experiment, 100 g of 0.4 graphene was oxidized to yield 98 g of graphene oxide, as follows. 100 g of graphene were added to 1000 ml aqueous reactant (10 vol % $H_2O_2$ in water (pH=3, sulfuric acid)) in a 5000 ml flask. The sample was stirred with a mechanical stirrer for 1h. During this time, the graphene was dispersed in the aqueous reactant and began to react. After 30 min, the temperature reached 80±5° C. Substantial foaming was observed. The reactor was continuously stirred until the temperature decreased to 60° C. Then, 1.25 g of solid $FeSO_4 \times 7H_2O$ was added at once. The temperature increased to 95 ±5° C. within 15 min. and then slowly decreased. The mixture was stirred for 24 hours. GO was collected via centrifugation (10 min @ 7000 rpm) and washed 5-7 times with water. Finally, GO was lyophilized to dryness overnight for characterization. Yield: 98 g (98%), zeta potential: $\xi=-16.7$ mV. As shown in FIG. 21, this graphene oxide remains stable up to T=600° C., indicating the superior thermal stability of the scaled-up core/shell graphene/graphene oxide compared to both, small-scale GO and conventionally prepared GO (Hummers Method). As shown in FIG. 22, FTIR confirmed successful oxidation of the upscaled batch.

Graphene Oxide Methyl Ester (mGO)—Three synthesis protocols

Figure 23:
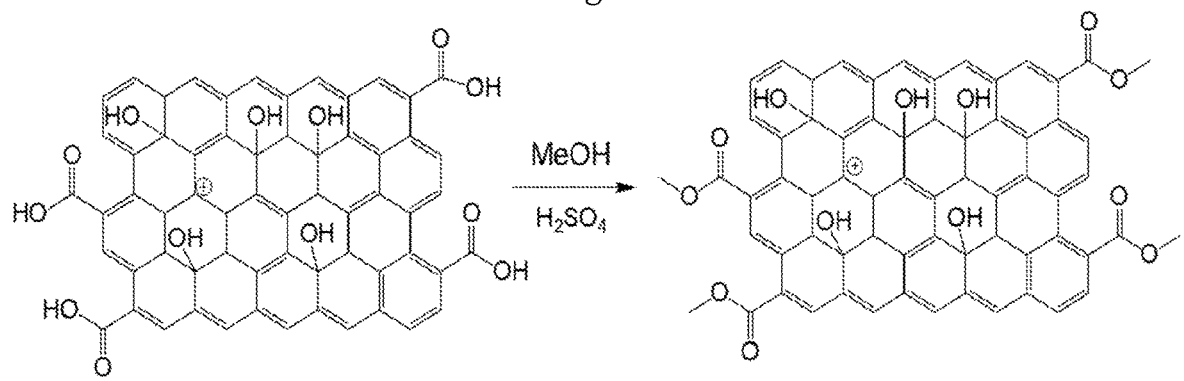
FIG. 23 depicts Fisher esterification of GO to mGO.

Fisher Esterification. 64.5 mg of graphene oxide (GO) were suspended via sonication in 100 mL of dry methanol in a 150 mL round bottom flask equipped with a magnetic stirrer and a reflux condenser. Next, 1 mL of concentrated sulfuric acid was added to the GO suspension, which was then refluxed for 24 hours (FIG. 23). After 24 hours, mGO was collected via centrifugation (10 min @ 7,000 rpm) and washed 5 times with distilled water. Finally, mGO was lyophilized to dryness overnight. Yield: 59.3g (65%), zeta potential: $\xi=-11.3$ mV.

Figure 24:
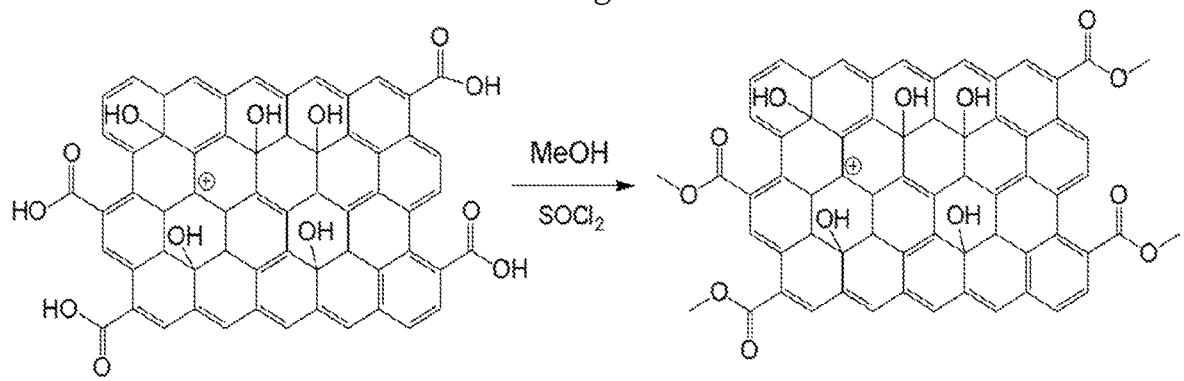
FIG. 24 depicts Thionyl chloride-mediated esterification of GO to mGO.
Figure 25:
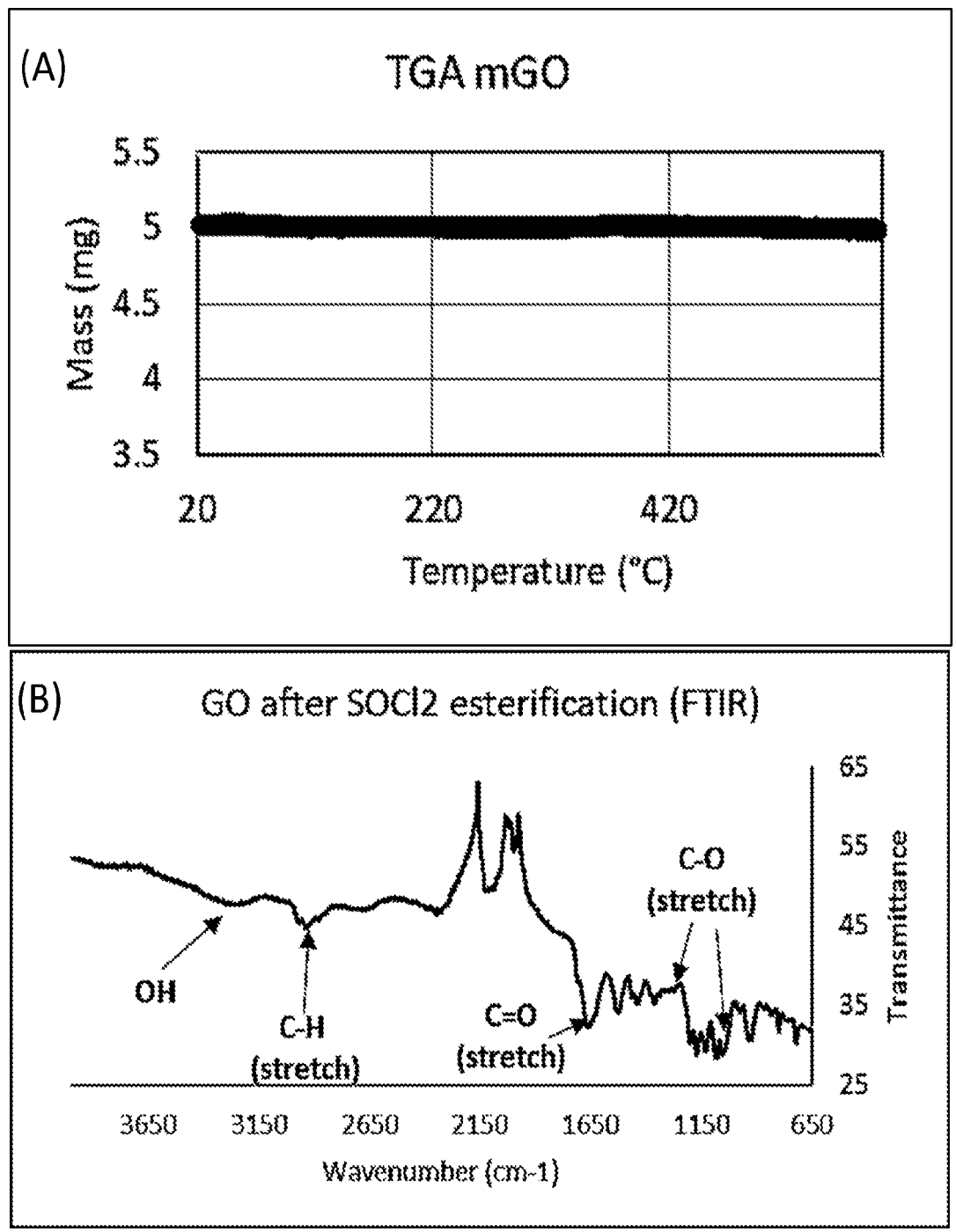
FIG. 25 shows graphs of (A) Differential Thermogravimetry (TGA) and (B) FTIR of Graphene Oxide Methyl Ester (mGO) prepared according to method B (thionyl chloride-mediated esterification).

Carboxylic acid chloride reaction. 500 mg of GO were suspended via sonication in 25 mL methanol in a 150 mL round bottom flask equipped with a magnetic stirring bar and reflux condenser. Then, the GO suspension was cooled down to 0° C. in an ice bath and 1.25 mL of thionyl chloride was added slowly (1.25 mL $SOCl_2$ is 5% by volume of the amount of methanol). After the addition of $SOCl_2$ was complete, the reaction was stirred at room temperature for 24 hours (FIG. 24). After 24 hours, the reaction was refluxed for 1 hr and then allowed to cool down to room temperature. Finally, mGO was collected via centrifugation (10 min @ 7,000 rpm) and washed 5 times with distilled water and then lyophilized to dryness overnight. Yield: 472 mg (94%), zeta potential: $\xi=-15.34$ mV. FIG. 25 shows the (A) thermal stability and (B) FTIR analysis of the product.

Figure 26:
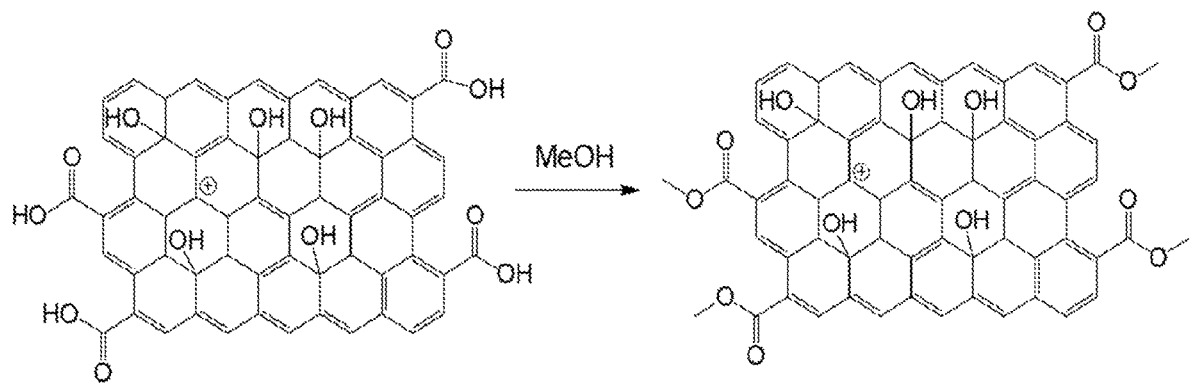
FIG. 26 depicts high pressure-mediated esterification of GO to mGO.

High pressure reactor. 500 mg of GO were suspended in 5 mL methanol in a Pyrex vial that was designed for a PARR 4560 pressure reactor (FIG. 26). The pressure reactor was then heated under argon atmosphere to 200° C./250 psi for 1 h. It was then allowed to cool to RT for another hour. Finally, mGO was collected via centrifugation (10 min @ 7,000 rpm) and washed 5 times with distilled water and then lyophilized to dryness overnight. Yield: 457 mg (91%), zeta potential: $\xi=-16.4$ mV.

Graphene Oxide Diethylene Glycol Ester (degGO)

Figure 27:
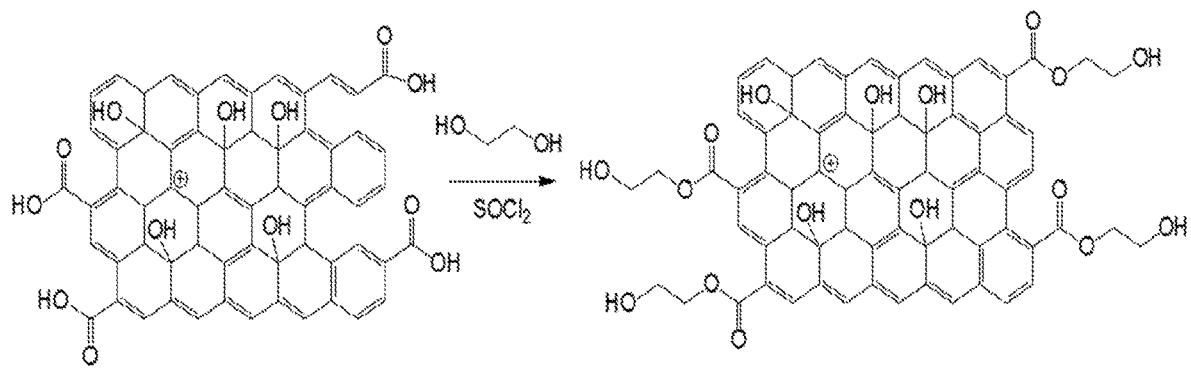
FIG. 27 depicts thionyl chloride-mediated esterification of graphene oxide (GO) to Graphene Oxide Diethylene Glycol Ester (degGO).
Figure 28:
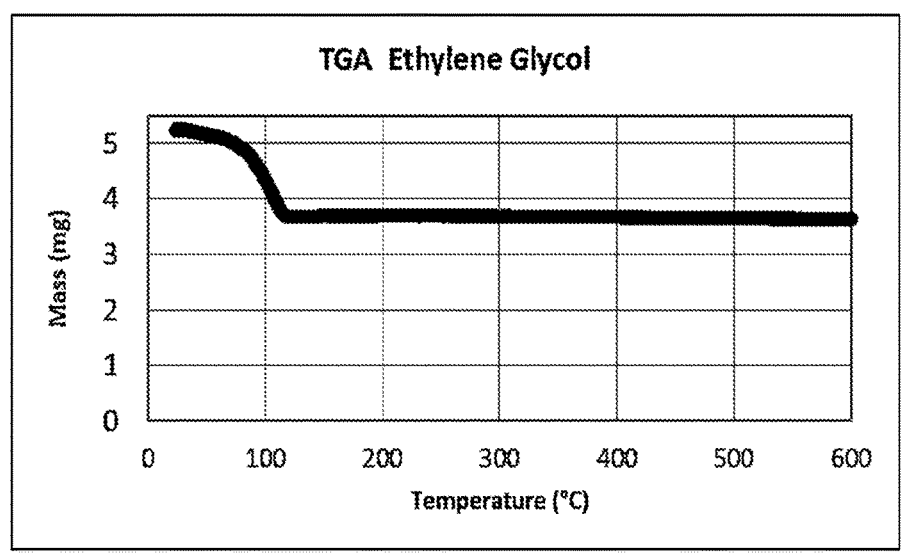
FIG. 28 is a graph of Differential Thermogravimetry (TGA) of degGO prepared via thionyl chloride-mediated esterification.

200 mg of mGO were suspended in 20 mL ethylene glycol via sonication in a 150 mL round bottom flask equipped with a magnetic stir bar and a reflux condenser (FIG. 27). The suspension was stirred at room temperature for 24 hours, followed by reflux at 197-198° C. for 1 hr. Then, the degGO suspension was cooled down to room temperature and collected via centrifugation (10 min @ 7,000 rpm) and washed 5 times with distilled water and then lyophilized to dryness overnight. Yield: 188 mg (94%), zeta potential: $\xi=-12.9$ mV. Thermal stability is shown in FIG. 28.

Graphene Oxide Amide (aGO)

Figure 29:
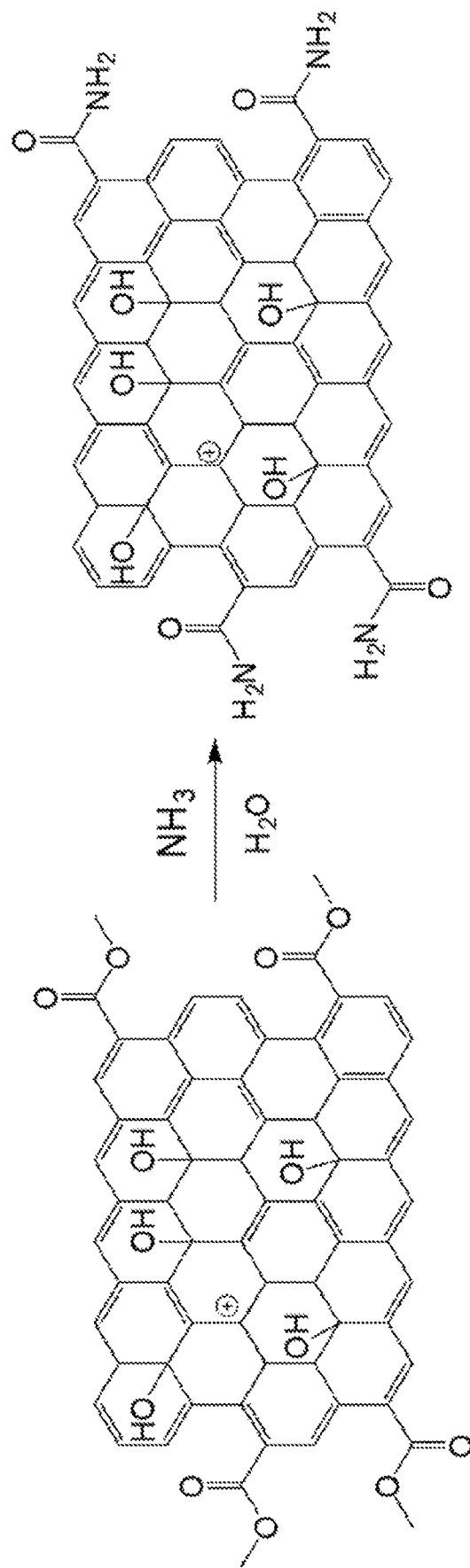
FIG. 29 depicts the synthesis of Graphene Oxide Amide (aGO) from mGO.
Figure 30:
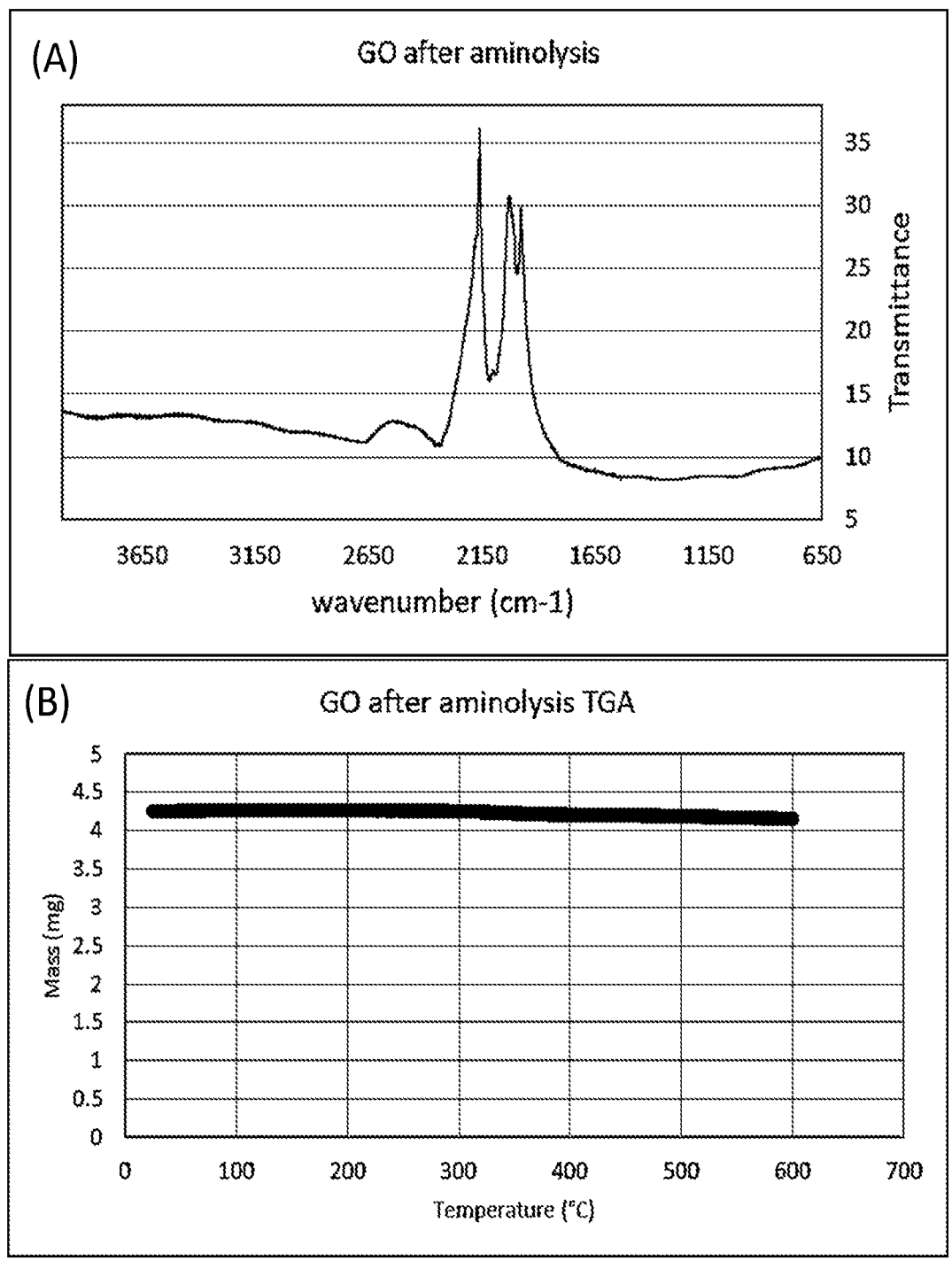
FIG. 30 shows graphs of (A) FTIR and (B) Differential Thermogravimetry (TGA) of aGO.

50 mg of mGO were suspended in 25 mL of ammonium hydroxide (30% $NH_3$ by weight in $H_2O$) via sonication in a 150 mL round bottom flask equipped with a magnetic stirrer and reflux condenser (FIG. 29). The suspension was refluxed for 1 hour and then allowed to cool down to room temperature. Then, amidated GO was collected via centrifugation (10 min @ 7,000 rpm) and washed 5 times with distilled water and then lyophilized to dryness overnight. YIELD: 34 mg (68%), zeta potential: $\xi=-27.6$ mV. FIG. 30 shows the (A) FTIR analysis and (B) thermal stability of aGO.

Graphene Oxide Diethylamide (deaGO)

Figure 31:
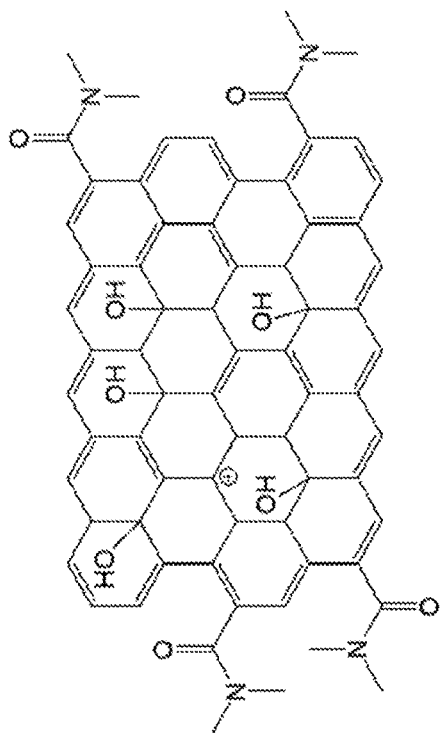
FIG. 31 depicts the synthesis of Graphene Oxide Diethylamide (deaGO) from mGO.
Figure 31:
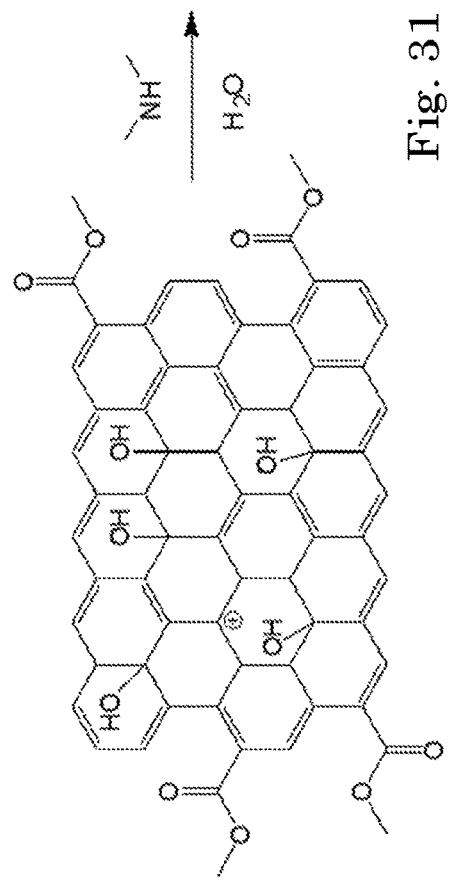

50 mg of mGO were suspended in 20 mL of dimethylformamide (DMF) containing 1 percent by weight (0.19 g) of dimethylamine via sonication in a 150 mL round bottom flask equipped with a magnetic stirrer and reflux condenser (FIG. 31). The suspension was refluxed for 1 hour at 154-155° C. and then allowed to cool down to room temperature. Then, amidated GO was collected via centrifugation (10 min @ 7,000 rpm) and washed 5 times with anhydrous diethyl ether and then lyophilized to dryness overnight. YIELD 31 mg (64%), zeta potential: $\xi=-24.8$ mV.

Graphene Oxide 1-aminohexane-6-amide (dahmGO)

Figure 32:
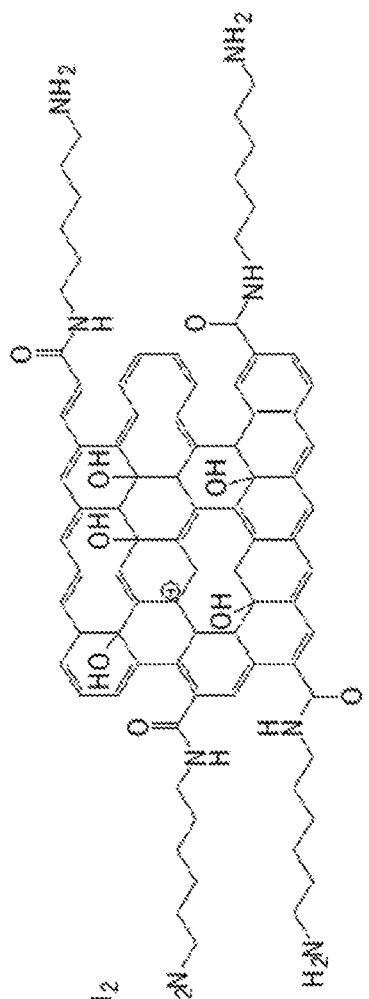
FIG. 32 depicts the synthesis of Graphene Oxide 1-aminohexane-6-amide (dahmGO) from mGO.
Figure 32:
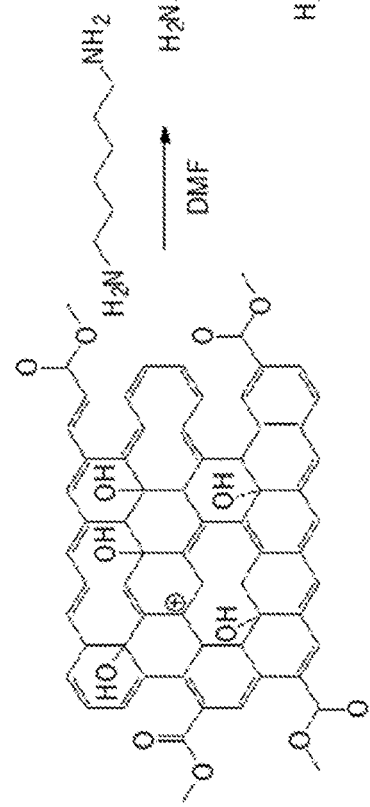

50 mg of mGO were suspended in 20 mL of DMF containing 1 percent by weight (0.19 g) of 1,6-diaminohexane via sonication in a 150 mL round bottom flask equipped with a magnetic stirrer and reflux condenser (FIG. 32). The suspension was refluxed for 1 hour at 154-155° C. and then allowed to cool down to room temperature. Then, amidated GO was collected via centrifugation (10 min @ 7,000 rpm) and washed 5 times with anhydrous diethyl ether and then lyophilized to dryness overnight. YIELD 33 mg (66%), zeta potential: $\xi=-22.7$ mV.

In view of the foregoing reactions, it will be appreciated that one could react the GO or mGO particles with virtually any dipolar, aprotic, and unipolar solvent, as well as sterically hindered alcohols, such as isopropanol and tert-butanol to create new compounds derivatives.

Attaching a Peptide to Graphene Oxide (GKK-GO Synthesis)

10 mg of GO were suspended in 5 mL DMF in a 5-dram clear glass vial via sonication. Next, 20 mg of the oligopeptide GKK, 5 mg EDC, and 5 mg DMAP were suspended and sonicated for 5 min. The suspension was then stirred at room temperature overnight. Finally, GKK-modified GO was collected via centrifugation (10 min @ 7,000 rpm) and washed 5 times with DMF and 5 times with anhydrous diethyl ether and then lyophilized to dryness. Yield: 15 mg (75%), zeta potential: $\xi=+1.51$ mV.

Attaching a Peptide to Graphene Oxide Methyl Ester (GKK-mGO)

10 mg of mGO were suspended in 5 mL DMF containing 10 mg of a short oligopeptide (GKK) in a Pyrex vial that was designed for a PARR 4560 pressure reactor. The pressure reactor was then heated under argon atmosphere to 200° C./170 psi for 1 h. It was then allowed to cool to RT for another hour. Finally, GKK-mGO was collected via centrifugation (10 min @ 7,000 rpm) and washed 5 times with DMF and 5 times with anhydrous diethyl ether and then lyophilized to dryness overnight. Yield: 17 mg (85%), zeta potential: $\xi=+4.8$ mV.

Figure 33:
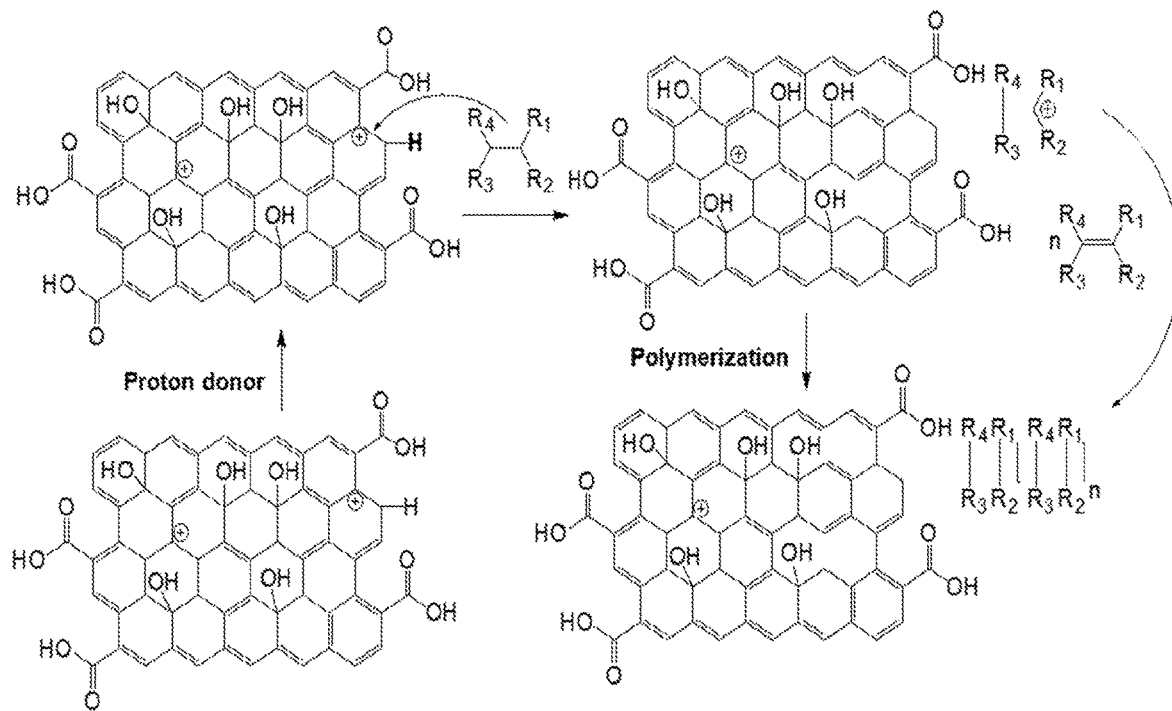
FIG. 33 is a depiction of proton-catalyzed polymerization with GO derivatives, where the R groups denote various monomeric moieties of the polymer backbone and/or side chains, e.g., carbon/alkyl groups, hydrogen, oxygen, etc., and n denotes the monomeric repeat units.
Figure 34:
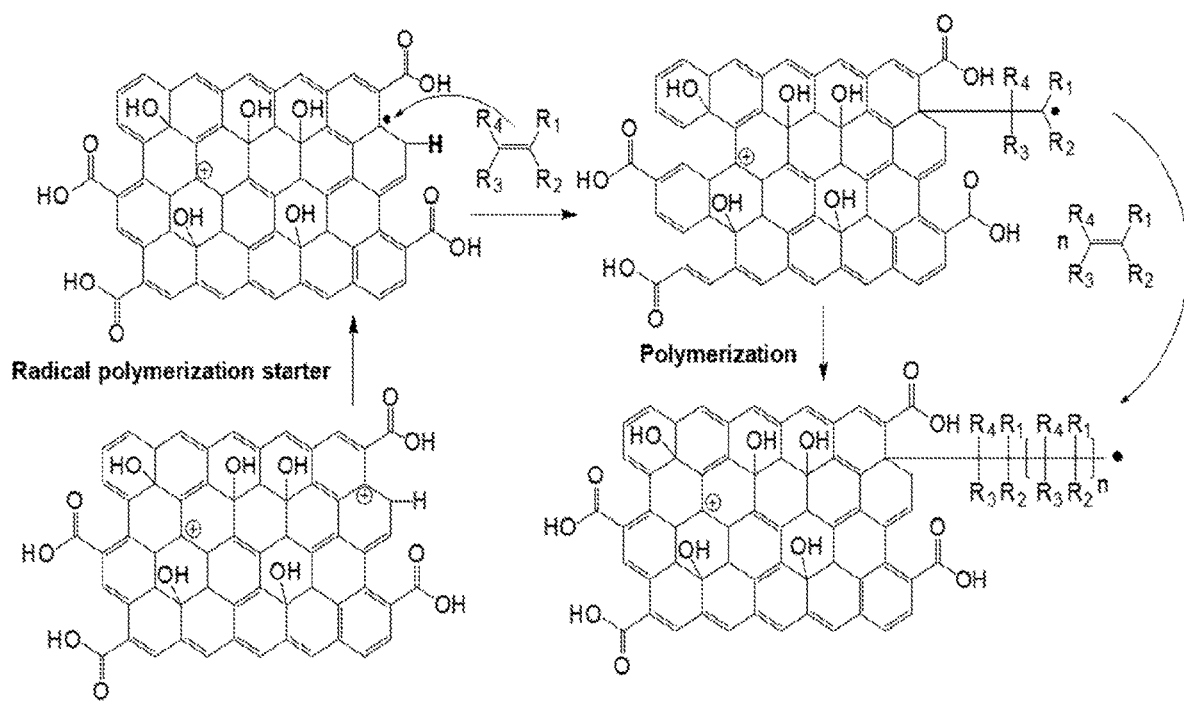
FIG. 34 is a depiction of radical-mediated polymerization with GO derivatives, where the R groups denote various monomeric moieties of the polymer backbone and/or side chains, e.g., carbon/alkyl groups, hydrogen, oxygen, etc., and n denotes the monomeric repeat units.
Figure 35:
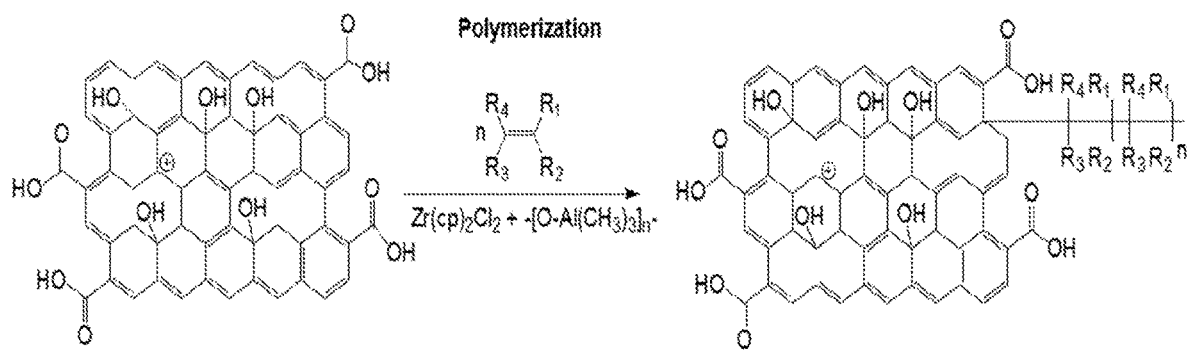
FIG. 35 is a depiction of metal-catalyzed polymerization. $Zr(cp)_2Cl_2 + —[O—Al(CH_3)_3]_n—$ (cp: cyclopentadienyl ligand) is one example for a metal organic polymerization catalyst (Ziegler-Natta types and later developments), where the R groups denote various monomeric moieties of the polymer backbone and/or side chains, e.g., carbon/alkyl groups, hydrogen, oxygen, etc., and n denotes the monomeric repeat units.

Integration of GO Derivatives into Polymers mGO can be integrated with various polyaddition polymers, including Low-density polyethylene (LDPE), High-density polyethylene (HDPE), Polypropylene (PP), Polyvinyl chloride (PVC), Polystyrene (PS), Polyacrylates (PA) and Polyacrylamides (PAM), Polymethyl-methacrylates (PMMA), and Polytetrafluoroethylene (TEFLON®) during via ionic, cationic, or metal-catalyzed polymerization synthesis (FIGS. 33-35), because it contains polymerizable double bonds.

In this work, 100 mg of mGO was dispersed in 5mL of anhydrous diethyl ether or tetrahydrofuran (THF) VIA sonication. Under Ar, 20 mg of LiAlH$_4$ (or NaH or other metal hydride) was added as a solid. This is followed by vigorous evolution of dihydrogen. The reactive mixture was stirred at RT until no more H2 evolution could be discerned (1 h) and then evaporated to dryness under reduced pressure at RT. The anionic mGO can be used as a starter in living polymerization reactions.

Figure 36:
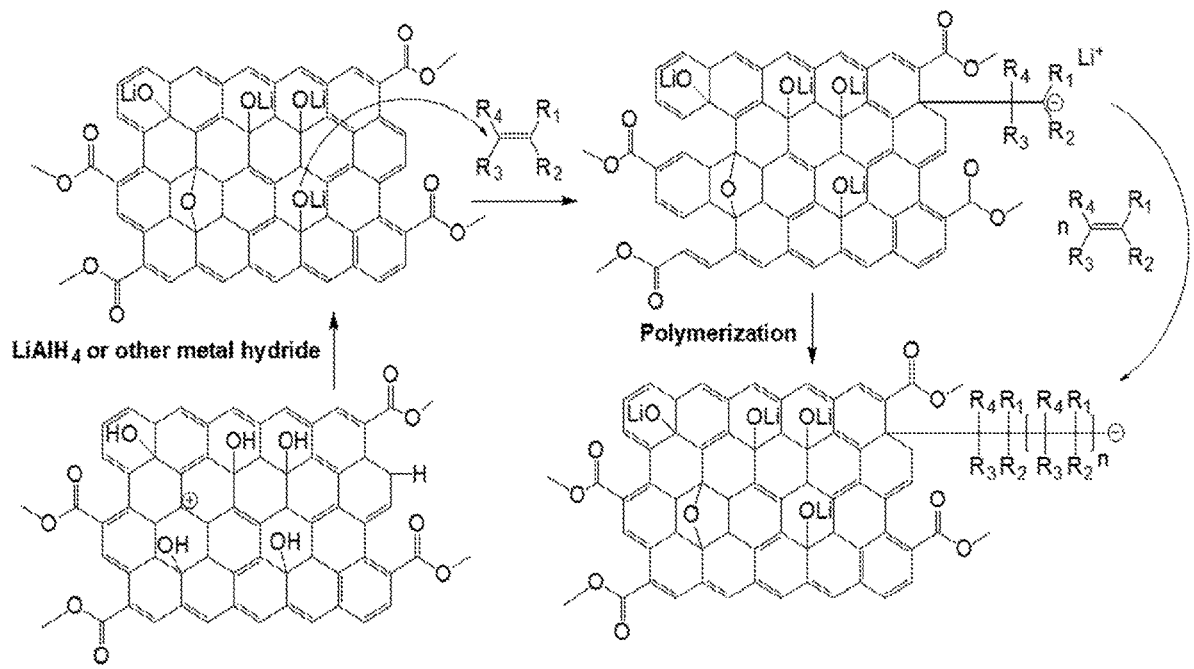
FIG. 36 is a depiction of anionic (living) polymerization, in which mGO is reacted with a metal hydride to initiate polymerization, where the R groups denote various monomeric moieties of the polymer backbone and/or side chains, e.g., carbon, hydrogen, oxygen, etc., and n denotes the monomeric repeat units.

As illustrated in FIG. 36, a typical anionic (living) polymerization consists of incubating LiAlH$_4$@mGO with a monomer containing at least one double bond at 60 to 150° C. under argon (or after at least three freeze-pump-thaw cycles) for 1 to 24 h.

Figure 37:
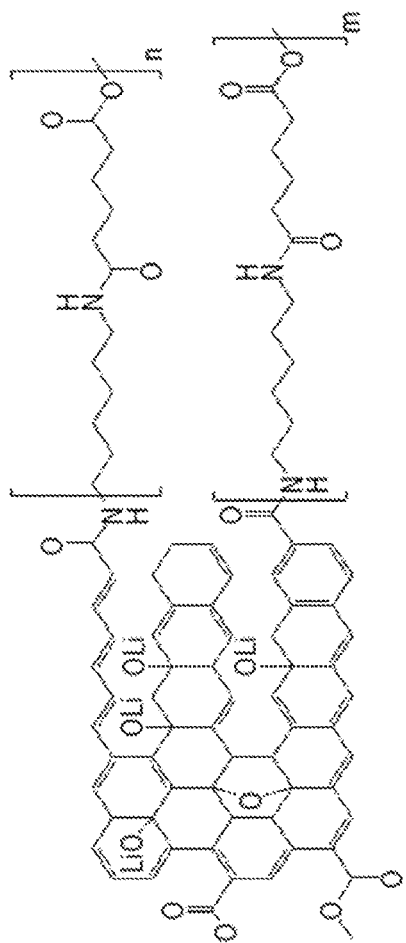
FIG. 37 depicts integration of graphene/graphene oxide (nano)particles into Nylon-type polymers, where m and n denote the monomeric repeat units.
Figure 37:
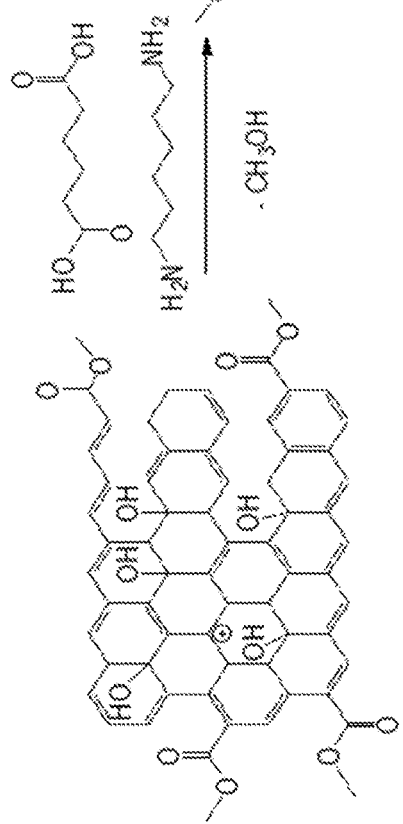
Figure 38:
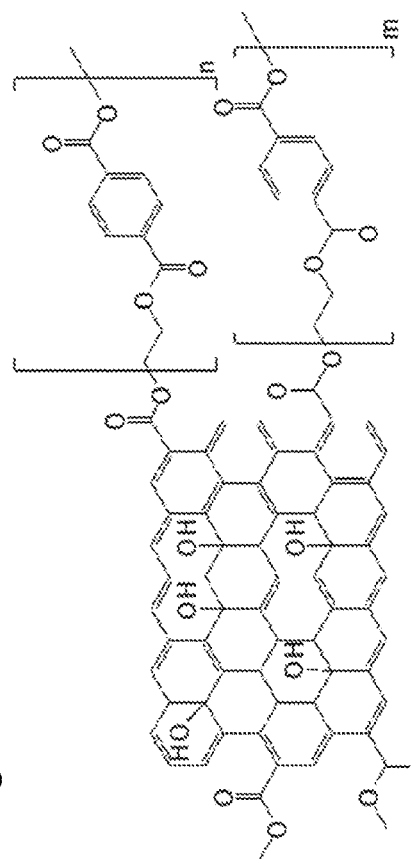
FIG. 38 depicts integration of graphene/graphene oxide (nano)particles into polyester-type polymers, where m and n denote the monomeric repeat units.
Figure 38:
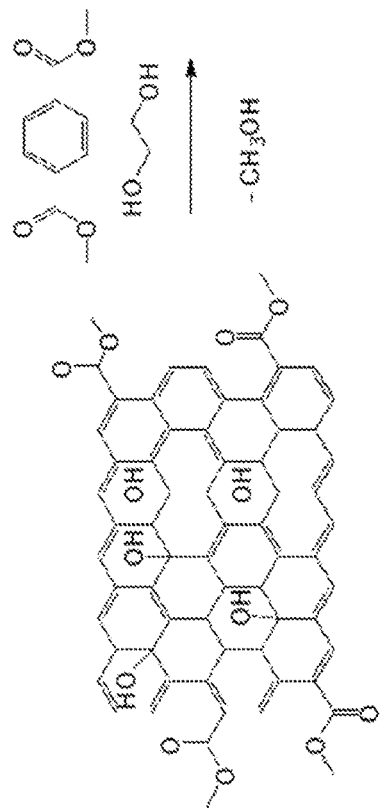

GO derivative, dahmGO reacts with all Nylon-type polymers (polyamides) during polycondensation. It can be blended with the starting mixture in virtually any mass ratio (FIG. 37). If the polycondensation reaction is performed at temperatures >80° C., mGO can be used as well. It will then exchange the methyl ester against an amide during the reaction. mGO also reacts with all polyesters during polycondensation (FIG. 38). It can be blended with the starting mixture in virtually any mass ratio. For polyethylene terephthalate, degGO can be used as well.

Both dahmGO or similar compounds and degGO or similar compounds (e.g. glycerol esters) react with isocyanates. Therefore, they are able to be incorporated in thermoplastic and duroplastic polyurethanes. The latter feature higher degrees of crosslinking and a higher amount by weight of graphene/graphene oxide derivative core/shell particles.

Figure 39:
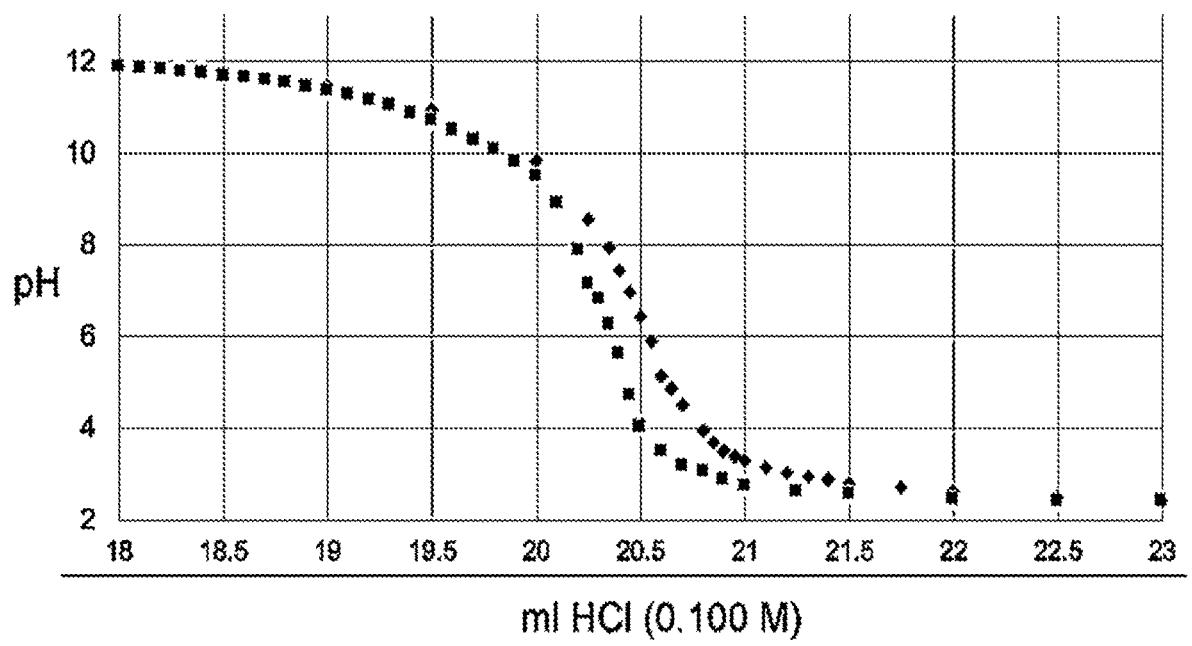
FIG. 39 is a graph of titration curves (pH vs. volume 0.100 M HCl) starting with adding 20 mL of 0.100 M NaOH to 100mg of GO. Black squares: titration of GO; gray diamonds: reference curve (no GO added).

Titration of Graphene Oxide 100 mg of Fenton-oxidized graphene oxide was suspended in 20 mL of 0.100 M NaOH. After stirring the suspension for 5 min at 300 K, 0.100 M HCl solution was added in incremental steps. At each step the pH of the solution was recorded using a pH meter after making sure equilibrium had been reached (1-5 min.), before addition of next amount of HCl. The same procedure was used with the same volume of NaOH but without the addition of GO. The difference in the volumes of HCl in the two titration curves for the same value of pH of ~7.00 gives the concentration of the ionized groups (hydroxyl and carboxyl groups) per weight increment of GO. The results are shown in FIG. 39. $\Delta$volume at pH ~7 is 170 uL. This is equivalent to $1.7 \times 10^{-5}$ moles acidic groups per 100 mg GO or $1.7 \times 10^{-4}$ moles per g GO. Furthermore, from the shape of the titration curve we conclude that the acidic group is predominantly (>95%) —COOH, since —OH will be (re)protonated at high pH where both, the GO and reference titration curved are almost identical. From this it can be calculated that each —COOH molecule occupies an area of approx. $10^{-18}$ m$^2$, which equates to 1 nm$^2$ on each side.

The invention claimed is:

1. A graphene/graphene oxide particulate comprising a multi-layered pristine graphene core with a thin graphene oxide surface coating or shell, wherein said graphene oxide surface coating or shell comprises one or more functional groups, wherein said one or more functional groups comprises greater than 90% carboxylic acid groups, wherein said particulate comprises at least 85% carbon and up to about 15% oxygen.

2. The graphene/graphene oxide particulate of claim 1, comprising at least 90% carbon and from about 3 to about 4% oxygen.

3. The graphene/graphene oxide particulate of claim 1, said particulate having high thermal stability up to about 550° C.

4. The graphene/graphene oxide particulate of claim 1, wherein said particulate is essentially free of intercalants, contaminants, and impurities.

5. The graphene/graphene oxide particulate of claim 1, wherein said particulate multi-layered pristine graphene core has d-spacing that is at least 99.5% identical to the d-spacing of a control graphene material that has not be oxidized.

6. The graphene/graphene oxide particulate of claim 1, wherein said thin graphene oxide surface coating or shell is further functionalized via said one or more functional groups.

7. The graphene/graphene oxide particulate of claim 6, wherein said thin graphene oxide surface coating or shell is further functionalized with methyl esters, primary amines, amides, alcohol esters, or combinations thereof.

8. The graphene/graphene oxide particulate of claim 1, wherein said thin graphene oxide surface coating or shell comprises a targeting moiety selected from the group consisting of aptamers, peptides, antibodies, receptor proteins, and combinations thereof.

9. The graphene/graphene oxide particulate 21, wherein said particulate is prepared by oxidizing the surface of detonation-synthesized graphene fractal aggregates.

10. The graphene/graphene oxide particulate 21, wherein said oxidation is carried out using hydrogen peroxide as the oxidizing agent at a temperature of 100° C. or less.

11. The graphene/graphene oxide particulate 21, wherein said multi-layered pristine graphene core comprises up to 15 graphene layers.

12. The graphene/graphene oxide particulate 1, wherein said one or more surface functional groups comprises greater than 95% carboxylic acid groups.

13. A composition comprising a plurality of graphene/graphene oxide particulates according to claim 1, said composition characterized macroscopically as a fluffy or fuzzy black powder or particulate.

14. The composition of claim 13, wherein said composition is a free-flowing powder.

15. An article comprising a substrate having a surface and a layer comprising a composition deposited on said substrate surface, wherein said composition comprises a plurality of graphene/graphene oxide particulates according to claim 1, said composition characterized macroscopically as a fluffy or fuzzy black powder or particulate.

16. The article of claim 15, wherein said composition is dispersed in a solvent system and wet-applied to said surface.

17. The article of claim 15, wherein said composition is mixed with a polymer system and printed on said surface.

18. The article of claim 15, wherein said graphene/graphene oxide particulates are reacted with a plurality of monomers to yield a composite polymer having said graphene/graphene oxide particulates integrated therein, said composite polymer being deposited on said substrate surface.

19. The article of claim 15, wherein said layer is a thin film having a thickness of less than 1 mm.

20. The article of claim 15, wherein said composition is sintered on said surface.

21. A composite article comprising a composition dispersed in a polymer, resin, or cement matrix, wherein said composition comprises a plurality of graphene/graphene oxide particulates according to claim 1, said composition characterized macroscopically as a fluffy or fuzzy black powder or particulate.

22. A composite polymer comprising a plurality of graphene/graphene oxide particulates according to claim 1 reacted with a polymer matrix.

23. The composite polymer of claim 22, wherein said polymer matrix is selected from the group consisting of polyethylene, polypropylene, polyvinyl chloride, polystyrene, polyacrylate, polyacrylamide, polymethylmethacrylate, polytetrafluoroethylene, polyester, polyamide, polyurethane, and co-polymers thereof.

24. A solid article comprising a composition comprising a plurality of graphene/graphene oxide particulates according to claim 1, said composition characterized macroscopically as a fluffy or fuzzy black powder or particulate, wherein said composition is molded into a porous body.

25. The solid article of claim 24, wherein said porous body is sintered.

* * * * *